(12) United States Patent
Okada et al.

(10) Patent No.: US 7,348,089 B2
(45) Date of Patent: Mar. 25, 2008

(54) MEMBRANE-ELECTRODE ASSEMBLY FOR DIRECT METHANOL TYPE FUEL CELL AND PROTON CONDUCTIVE MEMBRANE

(75) Inventors: Takashi Okada, Tokyo (JP); Kohei Goto, Tokyo (JP)

(73) Assignee: JSR Corporation, Tokyo (JP)

( * ) Notice: Subject to any disclaimer, the term of this patent is extended or adjusted under 35 U.S.C. 154(b) by 368 days.

(21) Appl. No.: 10/849,182

(22) Filed: May 20, 2004

(65) Prior Publication Data

US 2004/0265668 A1    Dec. 30, 2004

(30) Foreign Application Priority Data

May 21, 2003    (JP)    ............... 2003-143914

(51) Int. Cl.
*H01M 8/10* (2006.01)
(52) U.S. Cl. ............... 429/33; 429/46; 521/25; 521/27
(58) Field of Classification Search ............... 429/33
See application file for complete search history.

(56) References Cited

U.S. PATENT DOCUMENTS

| | | | |
|---|---|---|---|
| 5,403,675 A | 4/1995 | Ogata et al. | |
| 2002/0164513 A1* | 11/2002 | Asano et al. | 429/32 |
| 2002/0172850 A1* | 11/2002 | Asano et al. | 429/33 |
| 2004/0197632 A1* | 10/2004 | Sohma et al. | 429/33 |

FOREIGN PATENT DOCUMENTS

| | | |
|---|---|---|
| EP | 1 138 712 A2 | 10/2001 |
| EP | 1 245 554 A1 | 10/2002 |
| EP | 1 245 555 A1 | 10/2002 |
| EP | 1 329 444 A1 | 7/2003 |
| JP | 2003-113226 | 4/2003 |
| JP | 2004-346163 | 12/2004 |
| JP | 3975908 | 6/2007 |
| WO | WO 03/033566 A1 | 4/2003 |

\* cited by examiner

*Primary Examiner*—Jonathan Crepeau
*Assistant Examiner*—Tony Chuo
(74) *Attorney, Agent, or Firm*—Oblon, Spivak, McClelland, Maier & Neustadt, P.C.

(57) ABSTRACT

A membrane-electrode assembly for direct methanol type fuel cell and a proton conductive membrane for direct methanol type fuel cell are disclosed. The membrane-electrode assembly comprises a negative electrode and a positive electrode assembled via a proton conductive membrane, the negative electrode being provided with a negative electrode-side separator having a mechanism for feeding a methanol aqueous solution as a fuel, the positive electrode being provided with a positive electrode-side separator having a mechanism for feeding an oxidizing agent gas, and the proton conductive membrane comprising a polymer containing 0.05-99.95 mol % of a repeating constitutional unit represented by the formula (A), and 0.05-99.95 mol % of a repeating constitutional unit represented by the formula (B).

4 Claims, 15 Drawing Sheets

MEMBRANE-ELECTRODE ASSEMBLY FOR DIRECT METHANOL TYPE FUEL CELL AND PROTON CONDUCTIVE MEMBRANE

FIELD OF THE INVENTION

The present invention relates to a membrane-electrode assembly used for a direct methanol type fuel cell of undergoing power generation by feeding methanol directly to a cell without reforming it into hydrogen, and a proton conductive membrane for such a direct methanol type fuel cell.

DESCRIPTION OF THE RELATED ART

A direct methanol type fuel cell (DMFC) of undergoing power generation by feeding methanol directly to a cell without reforming it into hydrogen is recognized to have characteristic features such as powder generation performance, easiness of handling, and simplicity of the system and is widely noticed as a substitute power source for conventional lithium ion batteries as a potable power source for cellular phones, personal computers, and the like.

Now, both inorganic compounds and organic compounds are known as a material for electrolytic membranes to be used in conventional fuel cells. Examples of inorganic compounds include lauryl phosphate that is a hydrate. However, such inorganic compounds are not sufficient with respect to contact at the interface so that they are much problematic in forming a conductive layer on a substrate or electrode.

On the other hand, examples of organic compounds include polymers belonging to the so-called cation exchange resins, for example, sulfonated compounds of vinyl based polymers such as polystyrenesulfonic acid, perfluoroalkyl-sulfonic acid polymers represented by Nafion (a trade name of Du Pont), and perfluoroalkylcarboxylic acid polymers. As an electrolytic membrane for this DMFC, perfluoroalkyl-sulfonic acid based proton conductive membranes have been employed.

However, since the above perfluoroalkylsulfonic acid based proton conductive membranes are high in methanol permeability, there is encountered such a problem that so-called crossover in which methanol leaks from an anode to a cathode side with the transfer of water molecule occurs, resulting in a marked lowering of the battery performance. For this reason, it is a present state that a low-concentration methanol aqueous solution must be used, unavoidably resulting in a large reduction of the power generation efficiency.

As other organic proton conductive materials, sulfonated polyarylenes are known. The sulfonated polyarylenes are usually obtained by polymerizing an aromatic compound to produce a polymer and reacting the polymer with a sulfonating agent to introduce a sulfonic acid group into the polymer.

However, the conventional methods involve such problems that in introducing a sulfonic acid group, a large amount of a sulfonating agent such as concentrated sulfuric acid, fuming sulfuric acid, and chlorosulfuric acid is used. Also, there is encountered such a problem that it is not easy to control the amount and site for introducing a sulfonic acid group into the polymer. So, it is difficult to provide a membrane-electrode assembly and proton conductive membrane with high proton conductivity and improved methanol permeability.

SUMMARY OF THE INVENTION

The present invention has been made under the above background art.

An object of the present invention is to provide a membrane-electrode assembly and a proton conductive membrane for direct methanol type fuel cell using a sulfonic acid group-containing polyarylene having high proton conductivity and improved methanol permeability by controlling the amount and site for introducing a sulfonic acid group into the polymer and securing a properly hydrophobilized segment in the polymer.

The present invention provides a membrane-electrode assembly for direct methanol type fuel cell comprising a negative electrode and a positive electrode assembled via a proton conductive membrane, the negative electrode being provided with a negative electrode-side separator having a mechanism for feeding a methanol aqueous solution as a fuel, the positive electrode being provided with a positive electrode-side separator having a mechanism for feeding an oxidizing agent gas, and the proton conductive membrane comprising a polymer containing 0.05-99.95 mol % of a repeating constitutional unit represented by the following general formula (A):

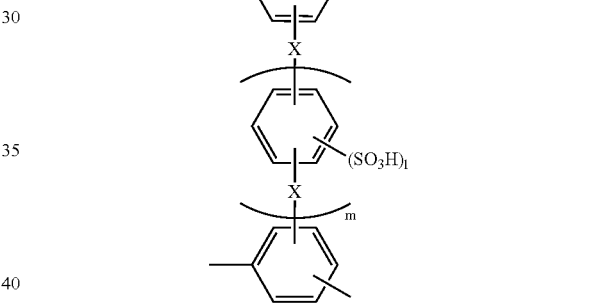

wherein X represents a single bond (—) or an electron withdrawing group or electron donating group; m represents an integer of 0-10; when m is 1-10, Xs may be the same or different; k represents an integer of 0-5; l represents an integer of 0-4; and (k+l)≧1, and 0.05-99.95 mol % of a repeating constitutional unit represented by the following general formula (B):

$$—Y— \quad (B)$$

wherein Y represents a hydrophobic divalent flexural group;

The membrane-electrode assembly for direct methanol type fuel cell is preferably that Y in the formula (B) is a structure represented by the following formula (B-1) or (B-2):

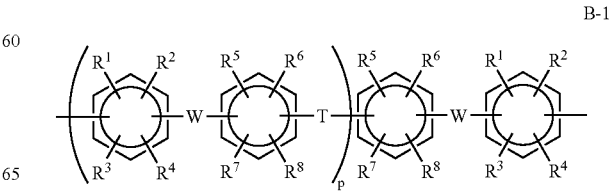

wherein $R^1$ to $R^8$ may be the same or different and each represents at least one atom or group selected from the group consisting of a hydrogen atom, a fluorine atom, an alkyl group, a fluorine-substituted alkyl group, an allyl group, an aryl group, and a cyano group; W represents a divalent electron withdrawing group; T represents at least one group selected from divalent groups represented by the following general formula (C-1) or (C-2):

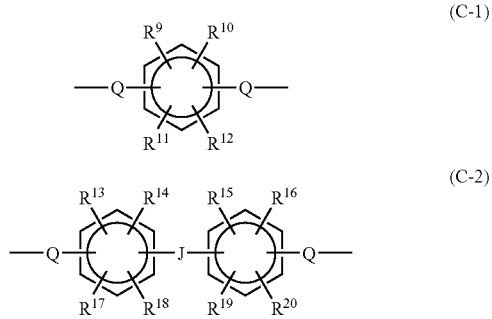

wherein $R^9$ to $R^{20}$ may be the same or different and each represents at least one atom or group selected from the group consisting of a hydrogen atom, a fluorine atom, an alkyl group, a fluorine-substituted alkyl group, an allyl group, an aryl group, and a cyano group; Q represents a divalent electron donating group; and J represents at least one atom or group selected from the group consisting of an alkylene group, a fluorine-containing alkylene group, an aryl-substituted alkylene group, an alkenylene group, an alkynylene group, an arylene group, a fluorenylidene group, —O—, —S—, —CO—, —CONH—, —COO—, —SO—, and —SO$_2$—; and p represents 0 or a positive integer;

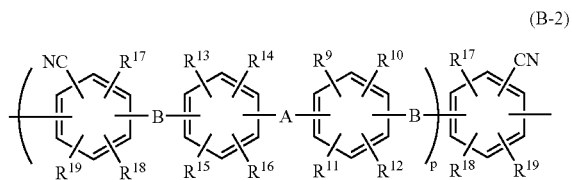

wherein $R^9$ to $R^{19}$ may be the same or different and each represents at least one atom or group selected from the group consisting of hydrogen atom, fluorine atom, an alkyl group, a fluorine-substituted alkyl group, an allyl group, an aryl group, and a cyano group; A represents a single bond or a divalent electron withdrawing group; B represents a divalent donating group; and p represents 0 or a positive integer.

The present invention further provides a proton conductive membrane for direct methanol type fuel cell comprising a polymer containing 0.05-99.95 mol % of a repeating constitutional unit represented by the following general formula (A):

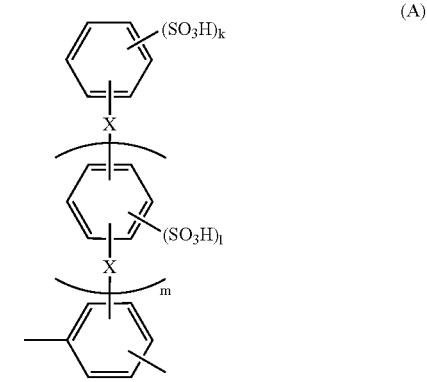

wherein X represents a single bond (—) or an electron withdrawing group or electron donating group; m represents an integer of 0-10; when m is 1-10, Xs may be the same or different; k represents an integer of 0-5; l represents an integer of 0-4; and (k+1)≧1, and 0.05-99.95 mol % of a repeating constitutional unit represented by the following general formula (B):

—Y— (B)

wherein Y represents a hydrophobic divalent flexural group.

Figure 1:
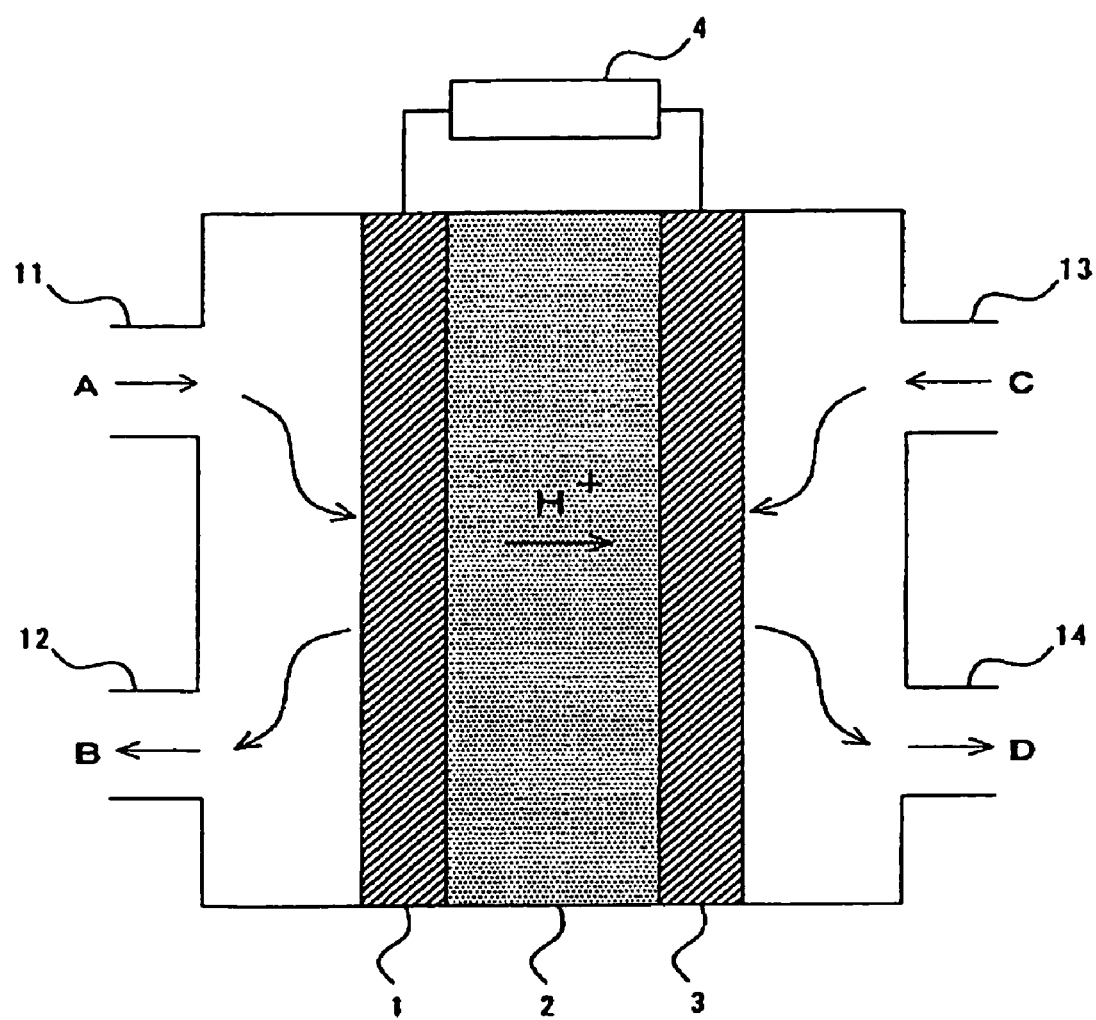
FIG. 1 is a constitutional view showing one embodiment of the direct methanol type fuel cell according to the present invention.

In the drawings:
1: Negative electrode
2: Proton conductive membrane
3: Positive electrode
4: External circuit

DETAILED DESCRIPTION OF THE INVENTION

The sulfonic acid group-containing polyarylene, the membrane-electrode assembly for direct methanol type fuel cell using the same, and the proton conductive membrane according to the present invention is specifically described below. Sulfonic acid group-containing polyarylene:

The sulfonic acid group-containing polyarylene according to the present invention contains a repeating constitutional unit represented by the following general formula (A) and a repeating constitutional unit represented by the general formula (B).

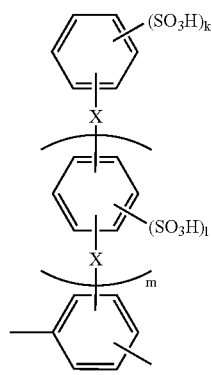
(A)

In the general formula (A), X represents a single bond (—) or an electron withdrawing group or electron donating group. Specific examples thereof include electron withdrawing groups such as —CO—, —SO$_2$—, —SO—, —CONH—, —COO—, —(CF$_2$)$_p$— (wherein p represents an integer of 1-10), and —C(CF$_3$)$_2$—; and electron donating groups such as —(CH$_2$)—, —C(CH$_3$)$_2$—, —O—, and —S—.

The electron withdrawing group as referred to herein means a group having a Hammett's substituent constant of 0.06 or more when positioned at the m-position of the phenyl group or 0.01 or more when positioned at the p-position of the phenyl group.

In the general formula (A), m represents an integer of 0-10, preferably 0-8, and more preferably 0-5. When m is 1-10, Xs may be the same or different.

In the general formula (A), k represents an integer of 0-5, l represents an integer of 0-4, and (k+l)≧1. It is preferable that k represents an integer of 1-4, l represents an integer of 0-3, and m represents an integer of 0-5.

—Y— (B)

wherein Y represents a hydrophobic divalent flexural group.

In the formula (B), the hydrophobic divalent flexural group is preferably a group having a structure represented by the following formula (B-1) or (B-2):

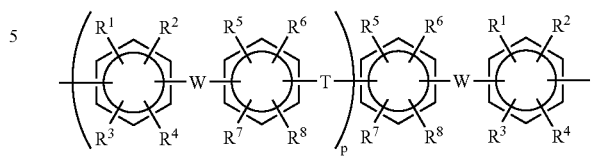
(B-1)

In the general formula (B-1), R$^1$ to R$^8$ may be the same or different and each represents at least one atom or group selected from the group consisting of a hydrogen atom, a fluorine atom, an alkyl group, a fluorine-substituted alkyl group, an allyl group, an aryl group, and a cyano group.

Examples of the alkyl group include a methyl group, an ethyl group, a propyl group, a butyl group, an amyl group, and a hexyl group. Of these groups, a methyl group and an ethyl group are preferable.

Examples of the fluorine-substituted alkyl group include a trifluoromethyl group, a perfluoroethyl group, a pentafluoroethyl group, a perfluoropropyl group, a perfluorobutyl group, a perfluoropentyl group, and a perfluorohexyl group. Of these groups, a trifluoromethyl group and a pentafluoroethyl group are preferable.

Examples of the allyl group include a propenyl group.

Examples of the aryl group include a phenyl group and a pentafluorophenyl group.

In the general formula (B-1), W represents a divalent electron withdrawing group such as —CO—, —SO$_2$—, —SO—, —CONH—, —COO— or —(CF$_2$)$_p$—.

In the general formula (B-1), T represents at least one group selected from divalent groups represented by the following general formula (C-1) or (C-2).

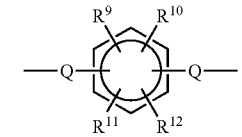
(C-1)

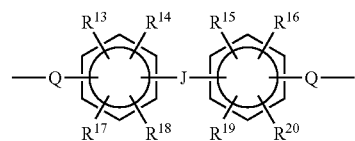
(C-2)

In the general formulae (C-1) and (C-2), R$^9$ to R$^{20}$ may be the same or different and each represents an atom or a group selected from the group consisting of a hydrogen atom, a fluorine atom, an alkyl group, a fluorine-substituted alkyl group, an allyl group, an aryl group, and a cyano group. Specifically, the same atoms or groups represented by R$^1$ to R$^8$ in the foregoing general formula (B-1) are enumerated.

In the general formulae (C-1) and (C-2), Q represents a divalent electron donating group such as —O—, —S—, —CH═CH—, and —C≡C—.

In the general formulae (C-1) and (C-2), J represents at least one atom or group selected from the group consisting of an alkylene group, a fluorine-containing alkylene group, an aryl-substituted alkylene group, an alkenylene group, an alkynylene group, an arylene group, a fluorenylidene group, —O—, —S—, —CO—, —CONH—, —COO—, —SO—, and —SO$_2$—.

Specific examples of the alkylene group, fluorine-containing alkylene group, aryl-substituted alkylene group, alkenylene group, alkynylene group, arylene group and fluorenylidene group include —C(CH$_3$)$_2$—, —CH═CH—, —CH═CH—CH$_2$—, —C≡C—, —(CF$_2$)$_p$— (wherein p represents an integer of 1-10), —C(CF$_3$)$_2$—, and a group represented by the following formula.

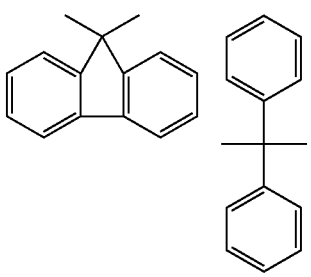

In the general formula (B-1), p represents 0 or a positive integer, the upper limit of which is usually 100, preferably 1-80, and more preferably 10-80.

In the general formula (B-2), R$^9$ to R$^{19}$ may be the same or different and each represents at least one atom or group selected from the group consisting of hydrogen atom, fluorine atom, an alkyl group, a fluorine-substituted alkyl group, an allyl group, an aryl group, and a cyano group; A represents a single bond or a divalent electron withdrawing group; B represents a divalent donating group; and p represents 0 or a positive integer.

The sulfonic acid group-containing polyarylene according to the present invention containing 0.05-99.95 mol %, preferably 10-99.5 mol %, of the repeating constitutional unit represented by the above general formula (A), and 0.05-99.95 mol %, preferably 0.5-90 mol %, of the repeating constitutional unit represented by the above general formula (B), and is generally a polymer having a structure represented by the following formula (D).

wherein W, T, X, R$^1$ to R$^8$, k, l and m are respectively synonymous with W, T, X, R$^1$ to R$^8$, k, l and m in the general formulae (A) and (B-1); and p represents 0 or a positive integer. In the case of (x+y)=100 mol %, x and y each represents a molar ratio.

When the repeating constitutional unit represented by the general formula (A) and the repeating constitutional unit represented by the general formula (B) are contained in the above-described proportion, the sulfonic acid group-containing polyarylene can simultaneously impart an effect for suppressing the methanol permeability to a low level while keeping conductivity.

Since the sulfonic acid group-containing polyarylene according to the present invention contains the sulfonic acid group-containing repeating constitutional unit represented by the general formula (A) and the properly hydrophobilized segment-containing repeating constitutional unit represented by the general formula (B) in a specific proportion, it has low methanol permeability and high proton conductivity and is suitably utilized for a proton conductive membrane for direct methanol type fuel cell.

Process of Producing Sulfonic Acid Group-containing Polyarylene:

The sulfonic acid group-containing polyarylene according to the present invention can be produced by, for example, coupling polymerizing an aromatic sulfonic acid ester represented by the following general formula (A') with an aromatic compound represented by the following general formula (B'-1) or (B'-2) and hydrolyzing the resulting copolymer.

Aromatic Sulfonic Acid Ester:

The aromatic sulfonic acid ester that is used in the invention is represented by the following general formula (A').

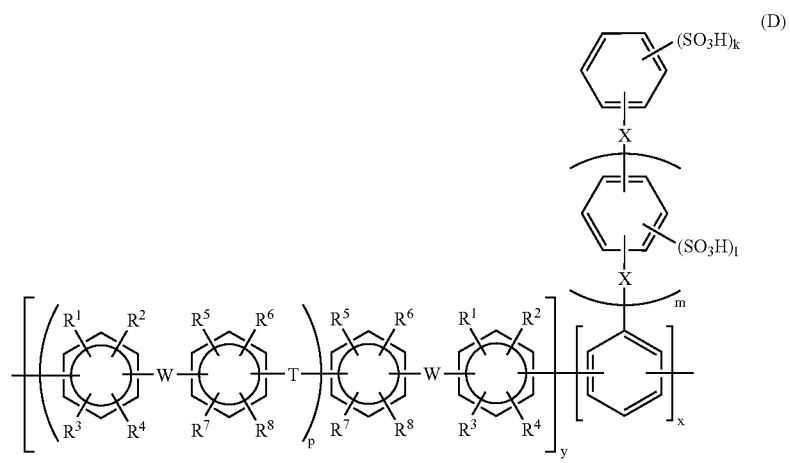

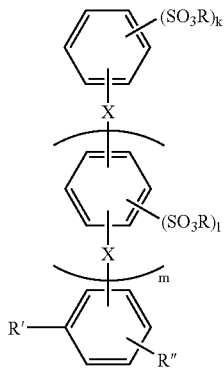

(A′)

In the general formula (A'), X is synonymous with X in the above general formula (A); and k and l are respectively synonymous with k and l in the above general formula (A).

In the general formula (A'), R represents a hydrocarbon group, and preferably a hydrocarbon group having 4-20 carbon atoms. Specific examples thereof include linear hydrocarbon groups, branched hydrocarbon groups, and alicyclic hydrocarbon groups such as a tert-butyl group, an isobutyl group, an n-butyl group, a sec-butyl group, a neopentyl group, a cyclopentyl group, a hexyl group, a cyclohexyl group, a cyclopentylmethyl group, a cyclohexylmethyl group, an adamantyl group, an adamantylmethyl group, a 2-ethylhexyl group, a bicyclo[2.2.1]heptyl group, and a bicyclo[2.2.1]heptylmethyl group.

In the general formula (A'), R' and R" may be the same or different and each represents a halogen atom other than a fluorine atom or a group represented by —OSO₂Z (wherein Z represents an alkyl group, a fluorine-substituted alkyl group, or an aryl group).

Examples of the alkyl group represented by Z include a methyl group and an ethyl group; examples of the fluorine-substituted alkyl group include a trifluoromethyl group; and examples of the aryl group include a phenyl group and a p-tolyl group.

Examples of the aromatic sulfonic acid ester represented by the general formula (A') include the following compounds.

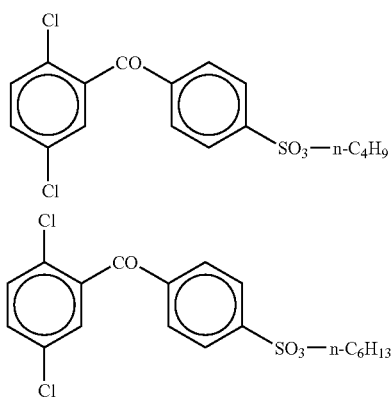

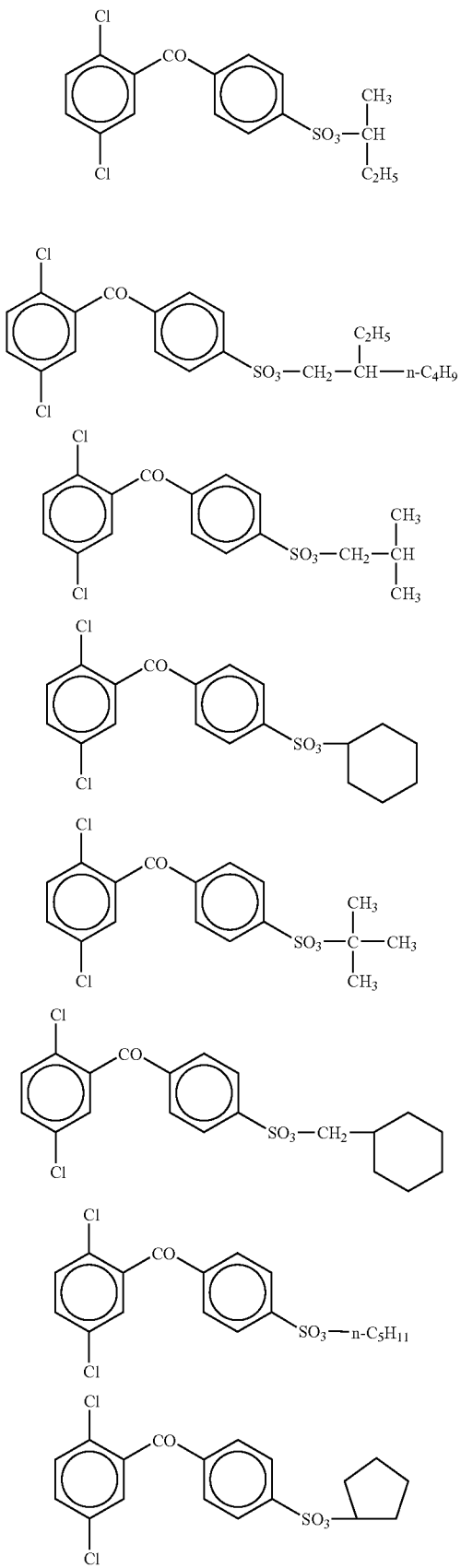

-continued

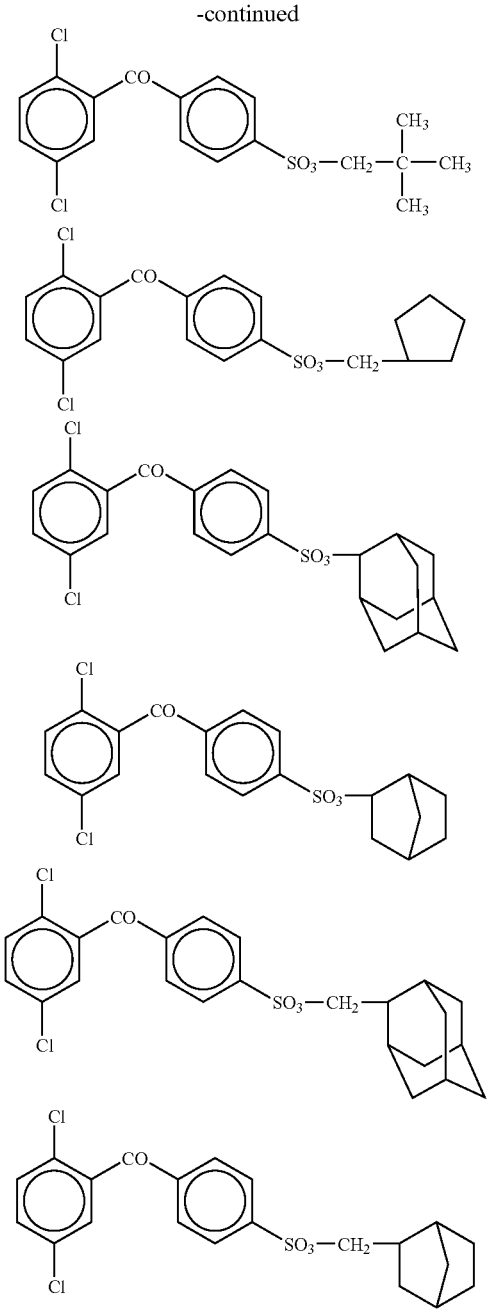

As the aromatic sulfonic acid ester represented by the general formula (A'), compounds resulting from substitution of the chlorine atom in the above compounds with a bromine atom, compounds resulting from substitution of —CO— in the above compounds with —SO$_2$—; and compounds resulting from substitution of the chlorine atom and —CO— in the above compounds with a bromine atom and —SO$_2$—, respectively are enumerated.

These ester groups are derived from a primary alcohol, and bulky substituents having a branched or alicyclic structure are preferable from the standpoint of stability during the polymerization step.

The aromatic sulfonic acid ester used in the invention, for example, a compound represented by the general formula (A') wherein m is 0, and k is 1, can be, for example, synthesized by the following method through (1) sulfonation/conversion into sodium salt, (2) chlorosulfonylation, and (3) sulfonic acid esterification. Other compounds represented by the general formula (A') can be synthesized in the same manner.

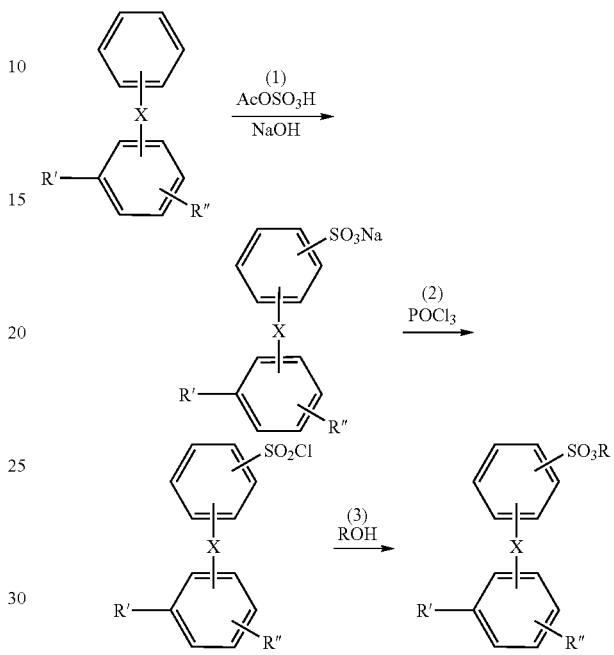

Aromatic Compound:

The aromatic compound that is used in the invention is represented by the following general formula (B'-1).

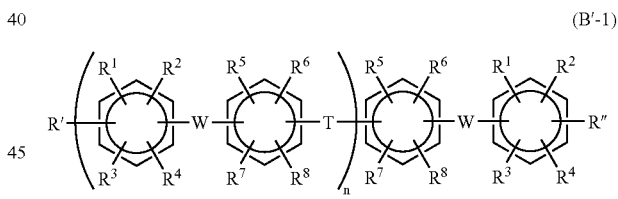

In the general formula (B'-1), $R^1$ to $R^8$, W and T are respectively synonymous with $R^1$ to $R^8$, W and T in the general formula (B-1); and n is synonymous with p in the general formula (B-1). In the general formula (B'-1), R' and R" are respectively synonymous with R' and R" in the general formula (A').

In the case of n=0, specific examples of the aromatic compound represented by the general formula (B'-1) include 4,4'-bis(4-chlorophenyl)diphenyl ether dicarboxylate, 4,4'-bis[(4-chlorophenyl)-1,1,1,3,3,3-hexafluoropropyl]diphenyl ether, 4,4'-bis[(4-chlorophenyl)-1,1,1,3,3,3-hexafluoropropyl]diphenyl ether, and 4,4'-bis[(4-chlorophenyl)tetrafluoroethyl]diphenyl ether. Compounds resulting from substitution of the chlorine atom in these compounds with a bromine atom or an iodine atom, compounds resulting from changing the halogen atom substituted at the 4-position in the these compounds with one substituted at the 3-position, and compounds resulting from changing at least one group substituted at the 4-position of diphenyl ether in these compounds with one substituted at the 3-position are further enumerated.

Examples of the aromatic compound represented by the general formula (B'-1) include 2,2-bis[4-{4-(4-chlorobenzoyl)phenoxy}phenyl]-1,1,1,3,3,3-hexafluorofluoropropane, bis[4-{4-(4-chlorobenzoyl)phenoxy}phenyl]sulfone, and compounds represented by the following formulae.

zophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone, and 1,3-bis(4-chlorobenzoyl)benzene) is reacted in the co-presence of a solvent capable of causing azeotropy with water (for

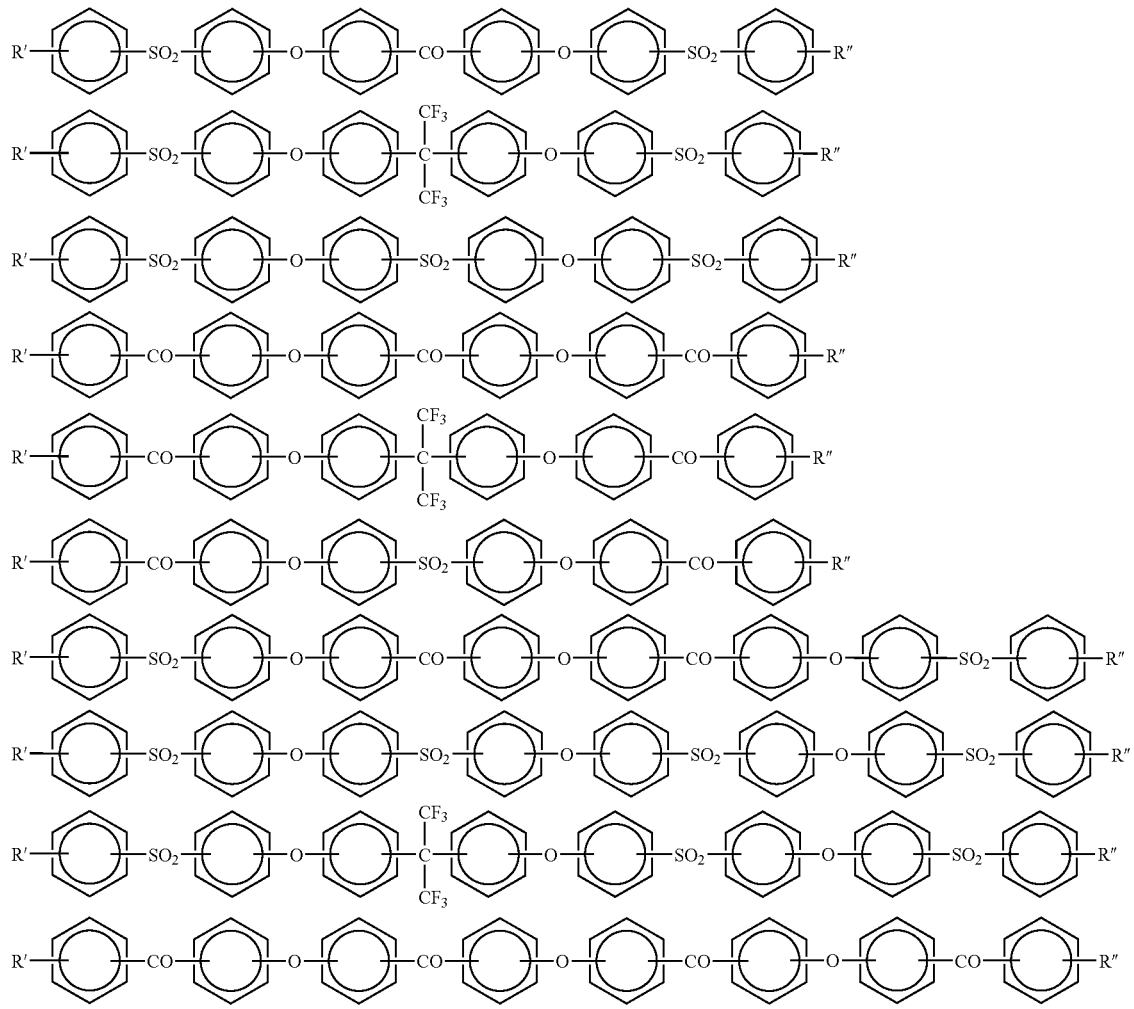

example, benzene, toluene, xylene, hexane, cyclohexane, octane, chlorobenzene, dioxane, tetrahydrofuran, anisole, and phenetole). In view of reactivity, fluorine compounds are preferable as the aromatic dihalide compound. However, in the case of taking into consideration the subsequent aromatic coupling reaction, it is necessary to fabricate the aromatic nucleophilic substitution reaction such that the terminal end becomes a fluorine atom. The active aromatic dihalide is used in an amount of 2-4 molar times, and preferably 2.2-2.8 molar times against bisphenol. Prior to the aromatic nucleophilic substitution reaction, the bisphenol may be converted into an alkali metal salt thereof in advance. The reaction temperature is in the range of 60-300° C., and preferably 80-250° C. The reaction time is in the range of 15 minutes to 100 hours, and preferably 1-24 hours. The most preferable method is to use a chlorofluoro com- The aromatic compound represented by the general formula (B'-1) can be, for example, synthesized by the following method.

First of all, to convert bisphenol into an alkali metal salt of bisphenol, an alkali metal (for example, lithium, sodium, and potassium) or an alkali metal compound (for example, alkali metal hydrides, alkali metal hydroxides, and alkali metal carbonates) is added in a polar solvent having a high dielectric constant (for example, N-methyl-2-pyrrolidone, N,N-dimethylacetamide, sulforane, diphenylsulfone, and dimethyl sulfoxide). In general, the alkali metal or the like is allowed to react rather excessively against the hydroxyl group of bisphenol, and is usually used in an amount of 1.1-2 equivalents, and preferably 1.2-1.5 equivalents.

In this regard, an electron withdrawing group-activated aromatic dihalide compound (for example, 4,4'-difluorobenpound containing halogen atoms having different reactivity from each other as the active aromatic dihalide. This is convenient for obtaining a desired activated chloro-terminated compound because the fluorine atom preferentially causes nucleophilic substitution reaction with phenoxide.

As other methods for synthesizing the aromatic compound represented by the general formula (B'-1), a method in which the nucleophilic substitution reaction is combined with electrophilic substitution reaction to synthesize the desired flexural compound comprising an electron withdrawing group and an electron donating group as described in JP-A-2-159 is enumerated.

Specifically, an electron withdrawing group-activated aromatic dihalide, for example, bis(4-chlorophenyl)sulfone, is subjected to nucleophilic substitution reaction with phenol to form a bisphenoxy substitution product. This substitution product is subjected to, for example, Friedel-Crafts reaction with 4-chlorobenzoic chloride to obtain the desired compound.

As the electron withdrawing group-activated aromatic dihalide, the compounds enumerated previously can be applied. Although the phenol compound may be substituted, unsubstituted compounds are preferable from the standpoints of heat resistance and flexural properties. Where the phenol compound is substituted, alkali metal salts thereof are preferable. As examples of alkali metal compounds that can be used in substituting the phenol compound, the compounds enumerated previously can be used. The amount of the alkali metal compound to be used is 1.2-2 molar times per mole of the phenol. In the reaction, the foregoing polar solvents or azeotropic solvents with water can be used.

To obtain the desired compound, a bisphenoxy compound is reacted with chlorobenzoic chloride as an acylating agent in the presence of an activating agent for Friedel-Crafts reaction of a Lewis acid, such as aluminum chloride, boron trifluoride, and zinc chloride. The chlorobenozoyl chloride is used in an amount of 2-4 molar times, preferably 2.2-3 molar times, to the bisphenoxy compound. The Friedel-Crafts activating agent is used in an amount of 1.1-2 equivalents per mole of the active halide compound such as chlorobenzoyl chloride as an acylating agent. The reaction time is in the range of 15 minutes to 10 hours, and the reaction temperature is in the range of from −20° C. to 80° C. As the solvent to be used, those which are inert to the Friedel-Crafts reaction, such as chlorobenzene and nitrobenzene, can be used.

An aromatic compound represented by the general formula (B'-1) wherein n is 2 or more can be, for example, obtained by polymerization through substitution reaction of an alkali metal salt of a bisphenol that becomes a supply source of ethereal oxygen as the electron donating group Q in the general formula (B'-1) (specifically, 2,2-bis(4-hydroxyphenyl)-1,1,1,3,3,3-hexafluoropropane, 2,2-bis(4-hydroxyphenyl)ketone, 2,2-bis(4-hydroxyphenyl)sulfone, 9,9-bis(4-hydroxyphenyl)fluorene, 9,9-bis(4-hydroxy-3,5-diphenylphenyl)fluorene, 2-phenylphenol, 4,4'-bis(4-hydroxyphenyl)diphenylmethane, 4,4'-bis(4-hydroxy-3-phenylphenyl)diphenylmethane, 4,4'-bis(4-hydroxy-3,5-diphenylphenyl)diphenylmethane, and 2-phenylhydroquinone) with an excessive amount of an active aromatic halide compound (for example, 4,4'-dichlorobenzophenone and bis(4-chlorophenyl)sulfone) or a combined system of 4,4'-difluorobenzophenone and 4,4'-chlorofluorobenzophenone in the presence of a polar solvent (for example, N-methyl-2-pyrrolidone, N,N-dimethylacetamide, and sulforane) according to the above synthesis procedures of the monomer.

Examples of such aromatic compounds include compounds represented by the following formulae.

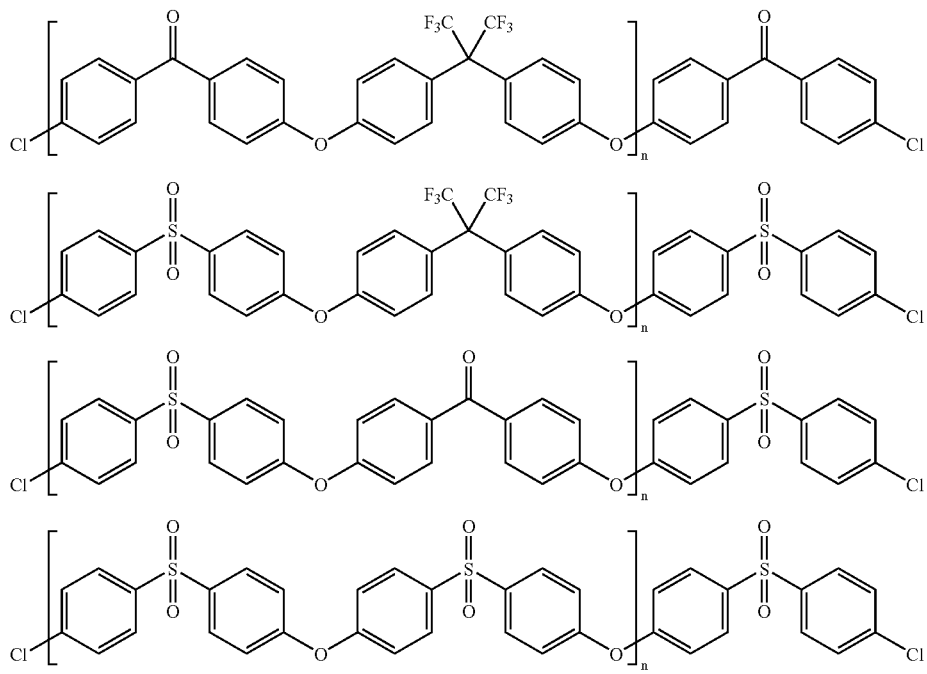

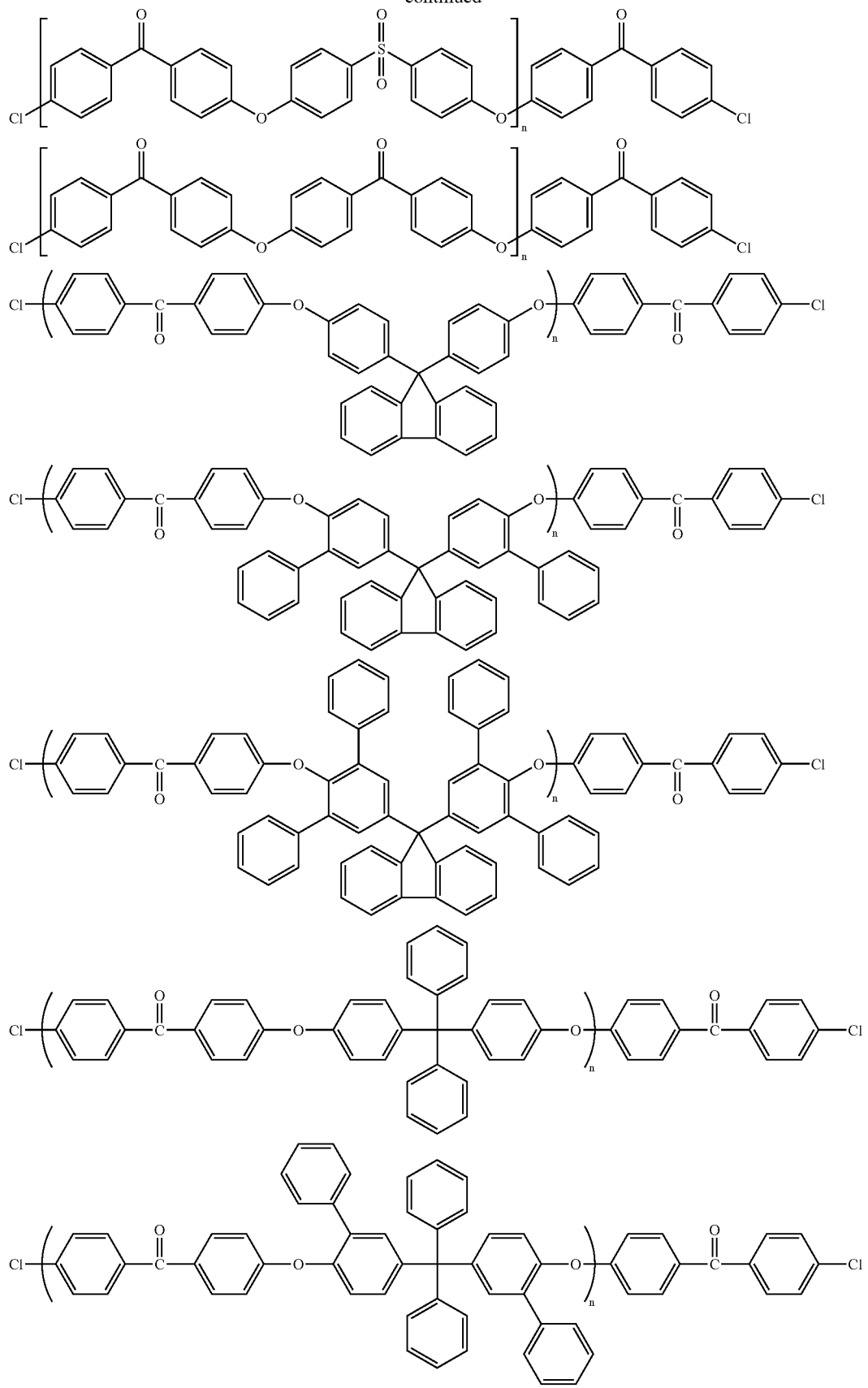

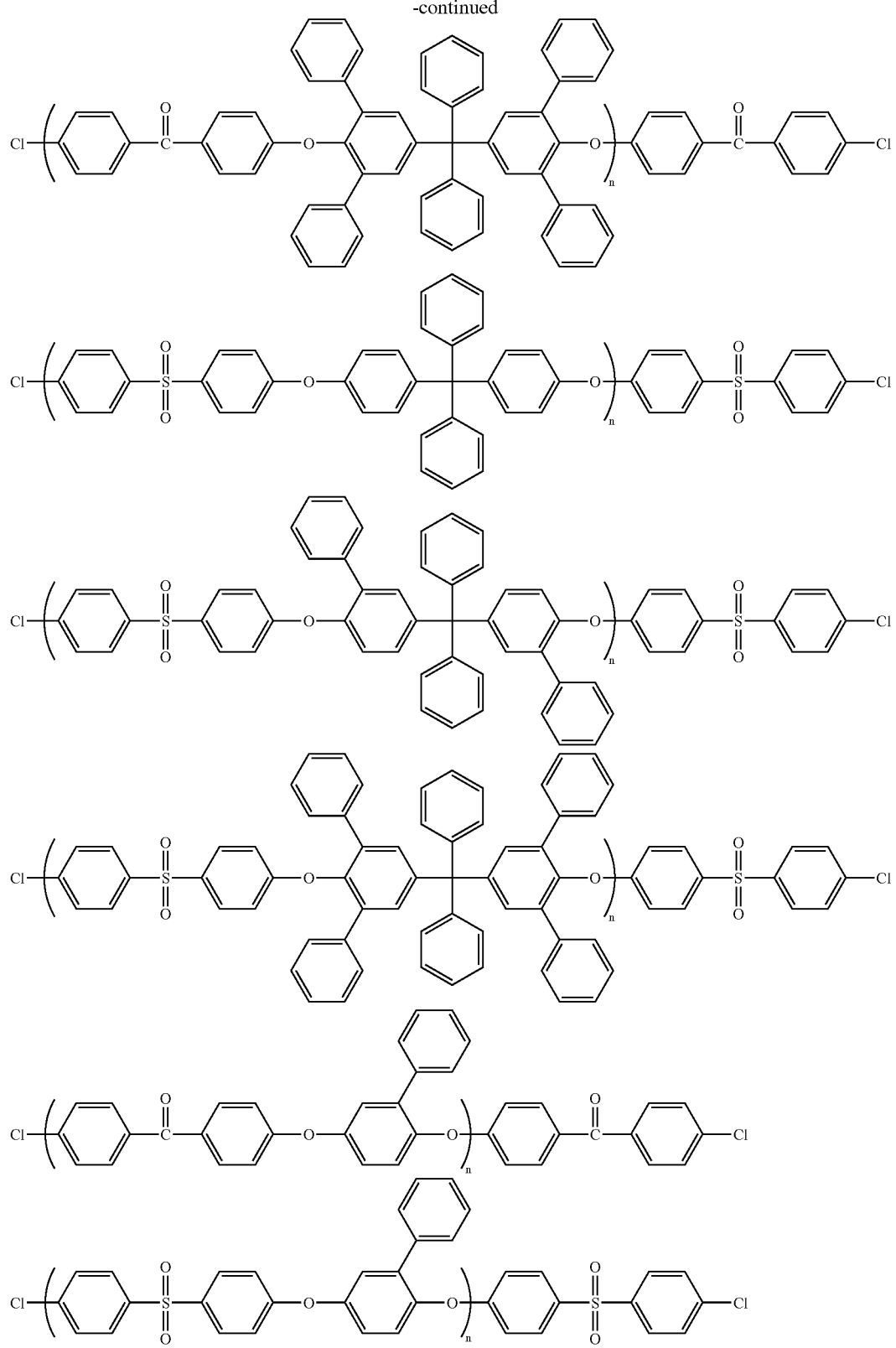
In the above formulae n represents a positive integer, the upper limit of which is usually 100, preferably 1-80, and more preferably 10-80. The molecular weight of the compound largely influences the methanol permeability, and as the molecular weight is high, the methanol permeability exhibits a low value. Where the molecular weight is too high, the polymerization activity lowers, or the solution viscosity of the sulfonated polymer becomes too high, and therefore, such is not preferable.

In the above formulae, the number of aromatic rings within the repeating unit is 3 or more, and preferably 3-10. The number of aromatic rings of the compound largely influences the methanol permeability, and as the number of aromatic rings is large, the methanol permeability exhibits a low value. Where the number of aromatic rings is too large, decrease in the proton conductivity is remarkable, and therefore, such is not preferable.

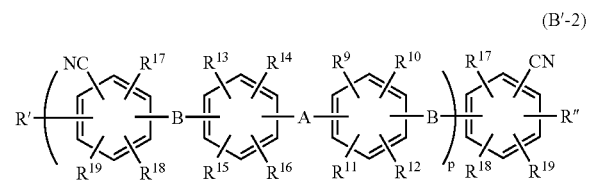

(B'-2)

In the general formula (B'-2), $R^9$ to $R^{19}$, A and B are respectively synonymous with $R^9$ to $R^{19}$, A and B in the general formula (A'); and p is synonymous with p in the general formula (B-2). In the general formula (B'-2), R' and R" are respectively synonymous with R' and R" in the general formula (A').

Synthesis of Polyarylene:

The polyarylene that is used for the production of the sulfonic acid group-containing polyarylene according to the present invention is obtained by reacting 0.05-99.95 mol %, and preferably 10-99.5 mol %, of at least one monomer selected from aromatic sulfonic acid ester derivatives represented by the general formula (A') and 0.05-99.95 mol %, and preferably 0.5-90 mol %, of at least one monomer selected from aromatic compounds represented by the general formula (B'-1) or (B'-2) in the presence of a catalyst.

In this case, the catalyst used is a catalyst system containing a transition metal compound. This catalyst system contains (1) a transition metal salt and a compound that becomes a ligand (hereinafter referred to as "ligand component"), or a transition metal complex having a ligand coordinated therein (including a copper salt) and (2) a reducing agent as essential components, and a "salt" may be further added thereto for the purpose of increasing the polymerization rate.

Examples of the transition metal salt include nickel compounds such as nickel chloride, nickel bromide, nickel iodide, and nickel acetylacetonate; palladium compounds such as palladium chloride, palladium bromide, and palladium iodide; iron compounds such as iron chloride, iron bromide, and iron iodide; and cobalt compounds such as cobalt chloride, cobalt bromide, and cobalt iodide. Of these compounds, nickel chloride and nickel bromide are especially preferable.

Examples of the ligand component include triphenylphosphine, 2,2'-bipyridine, 1,5-cyclooctadiene, and 1,3-bis(diphenylphosphino)propane. Of these compounds, triphenylphosphine and 2,2'-bipyridine are preferable. Those ligand components can be used alone or as mixtures thereof.

Examples of the transition metal complex having a ligand coordinated therein include nickel chloride bis(triphenylphosphine), nickel bromide bis(triphenylphosphine), nickel iodide bis(triphenylphosphine), nickel nitrate bis(triphenylphosphine), nickel chloride (2,2'-bipyridine), nickel bromide (2,2'-bipyridine), nickel iodide (2,2'-bipyridine), nickel nitrate (2,2'-bipyridine), bis-(1,5-cyclooctadiene)nickel, tetrakis(triphenylphosphine)nickel, tetrakis(triphenylphosphite)nickel, and tetrakis(triphenylphosphine)palladium. Of these compounds, nickel chloride bis(triphenylphosphine) and nickel chloride (2,2'-bipyridine) are preferable.

Examples of the reducing agent that can be used in the catalyst system include iron, zinc, manganese, aluminum, magnesium, sodium, and calcium. Of these reducing agents, zinc, magnesium, and manganese are preferable. Such a reducing agent can be used upon further activation by bringing it into contact with an acid such as organic acids.

Examples of the "salt" that can be used in the catalyst system include sodium compounds such as sodium fluoride, sodium chloride, sodium bromide, sodium iodide, and sodium sulfate; potassium compounds such as potassium fluoride, potassium chloride, potassium bromide, potassium iodide, and potassium sulfate; and ammonium compounds such as tetraethylammonium fluoride, tetraethylammonium chloride, tetraethylammonium bromide, tetraethylammonium iodide, and tetraethylammonium sulfate. Of these salts, sodium bromide, sodium iodide, potassium bromide, tetraethylammonium bromide, and tetraethylammonium iodide are preferable.

With respect to the proportions of the respective components used, the transition metal salt or transition metal complex is usually used in a proportion of 0.0001-10 moles, and preferably 0.01-0.5 moles, per mole of the total sum of the monomers. When this proportion is less than 0.0001 moles, the polymerization reaction may not proceed sufficiently. On the other hand, when it exceeds 10 moles, the molecular weight of the polyarylene obtained may lower.

In the catalyst system, in the case of using the transition metal salt and the ligand composition, the proportion of the ligand component used is usually 0.1-100 moles, and preferably 1-10 moles, per mole of the transition metal salt. When this proportion is less than 0.1 moles, the catalyst activity may possibly become insufficient. On the other hand, when it exceeds 100 moles, the molecular weight of the resulting polyarylene may lower.

The proportion of the reducing agent used is usually 0.1-100 moles, and preferably 1-10 moles, per mole of the total sum of the monomers. When this proportion is less than 0.1 moles, the polymerization may not proceed sufficiently, whereas when it exceeds 100 moles, the purification of the resulting polyarylene may be difficult.

Further, in the case of using the "salt", its use proportion is usually 0.001-100 moles, and preferably 0.01-1 mole, per mole of the sum of the monomers. When this proportion is less than 0.001 moles, an effect for increasing the polymerization rate may be insufficient, whereas when it exceeds 100 moles, the purification of the resulting polyarylene may be difficult.

Examples of polymerization solvents that can be used include tetrahydrofuran, cyclohexanone, dimethyl sulfoxide, N,N-dimethylformamide, N,N-dimethylacetamide, N-methyl-2-pyrrolidone, γ-butyrolactone, sulforane, γ-butyrolactam, dimethylimidazolidinone, and tetramethylurea. Of these polymerization solvents, tetrahydrofuran, N,N-dimethylformamide, N,N-dimethylacetamide, and N-methyl-2-pyrrolidone are preferable. It is preferred to use such a polymerization solvent after sufficiently drying.

The concentration of the sum of the monomers in the polymerization solvent is usually 1-90 wt %, and preferably 5-40 wt %.

In the polymerization, the polymerization temperature is usually 0-200° C., and preferably 50-120° C. The polymerization time is usually 0.5-100 hours, and preferably 1-40 hours.

In this way, by copolymerizing at least one monomer selected from the aromatic sulfonic acid esters represented by the general formula (A') with at least one monomer selected from the aromatic compounds represented by the general formula (B'-1) or (B'-2), a polymerization solution containing the polyarylene is obtained.

The resulting polyarylene has a molecular weight of 10,000-1,000,000, and preferably 20,000-800,000, in terms of a weight average molecular weight as reduced into polystyrene by gel permeation chromatography (GPC).

Sulfonic Acid Group-containing Polyarylene:

The sulfonic acid group-containing polyarylene according to the present invention can be obtained by hydrolyzing the sulfonic acid group-free polyarylene, thereby converting a sulfonic acid ester group ($-SO_3R$) in the compound represented by the general formula (A') into a sulfonic acid group ($-SO_3H$).

Examples of the hydrolysis include (1) a method in which the polyarylene is added to an excessive amount of water or an alcohol each containing a small amount of hydrochloric acid, and the mixture is stirred for 5 minutes or more;

(2) a method in which the polyarylene is allowed to react in trifluoroacetic acid at a temperature of about 80-120° C. for about 5-10 hours; and (3) a method in which the polyarylene is allowed to react in a solution containing 1-3 molar times, per mole of the sulfonic acid ester group ($-SO_3R$) in the polyarylene, of lithium bromide, for example, a solution of N-methylpyrrolidone, at a temperature of about 80-150° C. for about 3-10 hours.

The amount of the sulfonic acid group in the resulting sulfonic acid group-containing polyarylene is 0.5-3 meq/g, and preferably 0.8-2.8 meq/g. When this amount is less than 0.5 meq/g, the proton conductivity does not increase. On the other hand, when it exceeds 3 meq/g, there is some possibility that the hydrophilicity increases, whereby the resulting polymer becomes soluble in water, or is not soluble in water but soluble in hot water, or does not become soluble in water but is reduced in durability.

The amount of the sulfonic acid group can be easily adjusted by changing the proportion of the aromatic sulfonic acid ester (A') and the aromatic compound (B'-1) or (B'-2) used and further the kind and combination of the monomers.

The structure of the sulfonic acid group-containing polyarylene can be, for example, confirmed by C—O—C absorption at 1,220-1,260 $cm^{-1}$, C=O absorption at 1,640-1,700 $cm^{-1}$, and the like by the infrared absorption spectrum. The structure can further be confirmed from a peak assigned to an aromatic proton at 6.8-8.5 ppm by the nuclear magnetic resonance spectrum ($^1$H-NMR).

In the present invention, it is preferable that 90% or more of the sulfonic acid ester group ($-SO_3R$) in the polyarylene is converted into a sulfonic acid group ($-SO_3H$).

In the production process of the sulfonic acid group-containing polyarylene according to the present invention, since the aromatic sulfonic acid ester and the appropriate hydrophobilized segment-containing aromatic compound are used as monomers, it is possible to control the amount and site for introducing a sulfonic acid group into the polymer. It is also possible to produce a sulfonic acid group-containing polyarylene having improved methanol permeability of the polymer, which is suitably utilized for a proton conductive membrane for direct methanol type fuel cell. According to the present invention, it is possible to produce a sulfonic acid group-containing polyarylene without using a large amount of a sulfonating agent.

Proton Conductive Membrane:

The proton conductive membrane according to the present invention comprises the sulfonic acid group-containing polyarylene, and can be, for example, produced by dissolving the sulfonic acid group-containing polyarylene in a solvent to form a solution and forming the solution into a film by the casting method of casting the solution on a substrate and forming it into a film and other methods. As the substrate, substrates that are used in the conventional solution casting method can be used without particular limitations. Examples thereof include substrates made of a plastic or metal, and substrates made of a thermoplastic resin such as polyethylene terephthalate (PET) films are preferably used.

In preparing a proton conductive membrane from the sulfonic acid group-containing polyarylene, an inorganic acid such as sulfuric acid and phosphoric acid, an organic acid including carboxylic acids, a proper amount of water, etc., may be used jointly in addition to the sulfonic acid group-containing polyarylene.

Examples of the solvent for dissolving the sulfonic acid group-containing polyarylene include aprotic polar solvents such as N-methyl-2-pyrrolidone, N,N-dimethylformamide, γ-butyrolactone, N,N-dimethylacetamide, dimethyl sulfoxide, dimethylurea, and dimethylimidazolidinone (DMI). Of these solvents, N-methyl-2-pyrrolidone is especially preferable in view of solubility and solution viscosity. The aprotic polar solvent can be used alone or as mixtures thereof.

A mixture of the aprotic polar solvent and an alcohol can also be used as the solvent for dissolving the sulfonic acid group-containing polyarylene. Examples of the alcohol include methanol, ethanol, propyl alcohol, isopropyl alcohol, sec-butyl alcohol, and tert-butyl alcohol. Of these alcohols, methanol is especially preferable because it has an effect for decreasing the solution viscosity over a wide range of the formulation. The alcohol can be used alone or as mixtures thereof.

Where a mixture of an aprotic polar solvent and an alcohol is used as the solvent, a mixture having a formulation of 95-25 wt %, preferably 90-25 wt %, of the aprotic polar solvent and 5-75 wt %, preferably 10-75 wt %, of the alcohol (provided that the total is 100 wt %) is used. When the amount of the alcohol falls within the range, the effect for decreasing the solution viscosity is excellent.

The polymer concentration of the solution having a sulfonic acid group-containing polyarylene dissolved therein varies depending upon the molecular weight of the sulfonic acid group-containing polyarylene but is usually 5-40 wt %, and preferably 7-25 wt %. When this polymer concentration is less than 5 wt %, it is difficult to form a thick film, and pinholes are likely formed. On the other hand, when it exceeds 40 wt %, the solution viscosity is too high so that it is difficult to form the solution into a film. Further, the surface smoothness may fail.

The solution viscosity varies depending upon the molecular weight of the sulfonic acid group-containing polyarylene and the polymer concentration but is usually 2,000-100,000 mPa·s, and preferably 3,000-50,000 mPa·s. When the solution viscosity is less than 2,000 mPa·s, retentivity of the solution during the film formation is poor so that the solution may flow away from the substrate. On the other hand, when it exceeds 100,000 mPa·s, the viscosity is too high to extrude the solution from a die so that the film formation by the casting method may be difficult.

After the film formation, the resulting green film is dipped in water, whereby the organic solvent in the green film can be substituted with water. Thus, the amount of the residual solvent in the resulting proton conductive membrane can be reduced.

After the film formation but before dipping the green film in water, the green film may be preliminarily dried. The preliminary drying is carried out by holding the green film usually at a temperature of 50-150° C. for 0.1-10 hours.

In dipping the green film in water, a batchwise mode in which a sheet is dipped in water may be employed. A continuous manner in which the usually obtained laminated film in the film-like state formed on a substrate film (for example, PET) is dipped in water as it is, or a film separated from the substrate is dipped in water and wound up, can be applied.

In the case of the batchwise method, it is convenient because a method for setting a film to be treated in a frame, etc., suppresses the formation of wrinkles on the surface of the treated film.

In dipping the green film in water, the dipping may be carried out such that an angle ratio of water is 10 parts by weight or more, preferably 30 parts by weight or more, per 1 part by weight of the green film. To make the amount of the residual solvent of the resulting proton conductive membrane small as possible, it is desired to keep the contact ratio as large as possible. Further, it is effective for reducing the amount of the residual solvent of the resulting proton conductive membrane by exchanging water used for dipping or overflowing water to always maintain the concentration of the organic solvent in water at a fixed concentration or less. To make the in-plane distribution of the amount of the residual organic solvent in the proton conductive membrane narrow, it is effective to homogenize the concentration of the organic solvent in water by means of stirring, etc.

The temperature of water in dipping the green film in water is preferably in the range of 5-80° C. The higher the temperature, the faster the substitution rate of the organic solvent with water is. However, the amount of water absorption of the film becomes also large. Accordingly, the surface state of the proton conductive membrane obtained after drying may be rough. In general, a temperature range of 10-60° C. is convenient in view of the substitution rate and easiness of handling.

The dipping time varies depending upon the amount of the residual solvent at the initial stage or the contact ratio and treatment time but is usually in the range of 10 minutes to 240 hours, and preferably 30 minutes to 100 hours.

When the green film is dipped in water and then dried, a proton conductive membrane having a reduced amount of the residual solvent is obtained. The amount of the residual solvent of the thus obtained proton conductive membrane is usually 5 wt % or less.

It is possible to reduce the amount of the residual solvent of the resulting proton conductive membrane to 1 wt % or less depending upon the dipping condition. With respect to such a condition, for example, a method in which the contact ratio of water to the green film is 50 parts by weight or more per 1 part by weight of the green film, the temperature of water in dipping is 10-60° C., and the dipping time is 10 minutes to 10 hours is employable.

After dipping the green film in water, the film is dried at 30-100° C., preferably 50-80° C., for 10-180 minutes, preferably 15-60 minutes, and then dried in reduced pressure at 50-150° C. under a reduced pressure of preferably 500-0.1 mmHg for 0.5-24 hours. A proton conductive membrane can be thus obtained.

The proton conductive membrane obtained by the process of the present invention usually has a dry thickness of 10-100 μm, and preferably 20-80 μm.

In the present invention, it is possible to produce a proton conductive membrane comprising a sulfonic acid group-containing polyarylene by forming the polyarylene into a film by the above process without performing hydrolysis and then hydrolyzing the film according to the same manner described previously.

The proton conductive membrane of the present invention may contain an anti-aging agent, preferably a hindered phenol based compound having a molecular weight of 500 or more. By containing the anti-aging agent, it is possible to further enhance the durability as the proton conductive membrane.

Examples of the hindered phenol based compound having a molecular weight of 500 or more that can be used in the present invention include triethylene glycol-bis[3-(3-t-butyl-5-methyl-4-hydroxyphenyl)propionate] (a trade name: IRGANOX 245), 1,6-hexanediol-bis[3-(3,5-di-t-butyl-4-hydroxyphenyl)propionate] (a trade name: IRGANOX 259), 2,4-bis-(n-octylthio)-6-(4-hydroxy-3,5-di-t-butylanilino)-3,5-triazine (a trade name: IRGANOX 565), pentaerythyl-tetrakis[3-(3,5-di-t-butyl-4-hydroxyphenyl)propionate] (a trade name: IRGANOX 1010), 2,2-thio-diethylenebis[3-(3,5-di-t-butyl-4-hydroxyphenyl)propionate] (a trade name: IRGANOX 1035), octadecyl-3-(3,5-di-t-butyl-4-hydroxyphenyl)propionate (a trade name: IRGANOX 1076), N,N-hexamethylenebis(3,5-di-t-butyl-4-hydroxy-hydrocinnamide) (a trade name: IRGANOX 1098), 1,3,5-trimethyl-2,4,6-tris(3,5-di-t-butyl-4-hydroxybenzyl)benzene (a trade name: IRGANOX 1330), tris-(3,5-di-t-butyl-4-hydroxybenzyl)isocyanurate (a trade name: IRGANOX 3114), and 3,9-bis[2-[3-(3-t-butyl-4-hydroxy-5-methylphenyl)propionyloxy]-1,1-dimethylethyl]-2,4,8,10-tetraoxaspiro[5.5]undecane (a trade name: SUMILIZER GA-80).

In the present invention, it is preferred to use the hindered phenol based compound having a molecular weight of 500 or more in an amount of 0.01-10 parts by weight per 100 parts by weight of the sulfonic acid group-containing polyarylene.

The constitution of the direct methanol type fuel cell according to the present invention is described below.

FIG. 1 is a constitutional view of the direct methanol type fuel cell.

As shown in FIG. 1, the direct methanol type fuel cell is provided with a negative electrode 1, an electrolytic membrane 2 contacting with the negative electrode 1, a positive electrode 3 provided opposite the negative electrode 1 and contacting with the electrolytic membrane 2, and an external circuit 4 connected to the negative electrode 1 and the positive electrode 3. As described previously, this electrolytic membrane 2 includes a sulfonated polyarylene.

The positive electrode and the negative electrode are each formed of carbon having a metallic catalyst (such as platinum) supported thereon, an electrolyte, a dispersant, and the like.

Although the electrolytic membrane of the present invention exhibits excellent low methanol permeability, it can be combined with conventional methods such as combination of a barrier film in the proton conductive membrane and formation of an additional catalyst layer on the surface of the proton conductive membrane.

The direct methanol fuel cell is provided with a first passage 11, a second passage 12, a third passage 13, and a fourth passage 14. A methanol aqueous solution as a fuel is fed into this first passage 11. The aqueous solution having a reduced amount of methanol (containing carbon dioxide) is discharged from the second passage 12. Air containing oxygen is fed into the third passage 13. The gas having a reduced amount of oxygen (containing water) is discharged from the fourth passage 14.

The reaction occurred in the direct methanol type fuel cell is described below.

In the negative electrode 1, methanol reacts with water to form carbon dioxide, a hydrogen ion, and an electron. The hydrogen ion passes through the electrolytic membrane 2 and goes toward the positive electrode 3, and the electron flows into the external circuit 4. That is, in the negative electrode 1, the following reaction occurs.

CH₃OH+H₂O→CO₂+6H⁺+6e⁻

In the positive electrode 3, oxygen reacts with the hydrogen ion come from the negative electrode 1 and the electron come from the external circuit 4 to form water. That is, the following reaction occurs in the positive electrode 3.

(3/2)O₂+6H⁺+6e⁻→3H₂O

As the whole, the reaction can be expressed as follows.

CH₃OH+(3/2)O₂→CO₂+2H₂O

The proton conductive membrane of the present invention can be utilized as proton conductive membranes usable for electrolytes for primary battery, electrolytes for secondary battery, high-molecular solid electrolytes for fuel cell, display elements, various sensors, signal transmission media, solid capacitors, ion exchange membranes, and the like.

The proton conductive membrane and membrane-electrode assembly according to the present invention exhibits excellent low methanol permeability while keeping high proton conductivity and therefore, has excellent characteristics as an electrolytic membrane and membrane-electrode assembly for direct methanol type fuel cell using methanol as the raw material. The proton conductive membrane and membrane-electrode assembly according to the present invention can be suitably used for applications such as fuel cells for household power source, fuel cell automobiles, fuel cells for cellular phone, fuel cells for person computer, fuel cells for potable terminal, fuel cells for digital camera, fuel cells for potable CD or MD, fuel cells for headphone stereo, fuel cells for pet robot, fuel cells for power assisted bicycle, and fuel cells for electric scooter.

The proton conductive membrane and membrane-electrode assembly according to the present invention has low methanol permeability and high proton conductivity and is suitable for an application to a proton conductive membrane for direct methanol type fuel cell.

The present invention is described in more detail by reference to the following Examples, but it should be understood that the invention is not construed as being limited thereto.

In the following Examples, the sulfonic acid equivalent, molecular weight, proton conductivity, and methanol permeability were determined in the following manners.

1. Sulfonic Acid Equivalent:

The resulting sulfonic acid group-containing polyarylene was thoroughly washed with water until the washings had become neutral, thereby removing the residual free acid. After drying, a prescribed amount thereof was weighed, dissolved in a mixed solvent of THF/water, and titrated with a standard solution of NaOH using phenolphthalein as an indicator. The sulfonic acid equivalent was then determined from a point of neutralization.

2. Measurement of Molecular Weight:

A weight average molecular weight of the polyarylene before hydrolysis was determined using tetrahydrofuran (THF) as a solvent in terms of a molecular weight as reduced into polystyrene by GPC. The molecular weight of the sulfonic acid group-containing polyarylene after hydrolysis was determined using, as an eluant, N-methyl-2-pyrrolidone (NMP) to which lithium bromide and phosphoric acid had been added as solvents in terms of a molecular weight as reduced into polystyrene by GPC.

3. Measurement of Proton Conductivity:

An alternating current resistance was determined by pressing platinum wires (diameter: 0.5 mm) on the surface of a stripe-shaped proton conductive membrane sample having a width of 5 mm, holding the sample in a thermo-hygrostat and measuring an alternating current impedance between the platinum wires. That is, impedances at an alternating current of 10 kHz in the circumstance at a relative humidity of 80% and at temperature of 25° C. or 60° C. were measured. A chemical impedance analysis system manufactured by NF Corporation was used as a resistance analyzer, and JW241 manufactured by Yamato Scientific Co., Ltd. was used as the thermo-hygrostat. Five platinum wires were pressed at intervals of 5 mm, and the wire spacing was changed between 5 mm and 20 mm, thereby measuring the alternating current resistance. A specific resistance of the membrane was calculated from the wire spacing and a gradient of the resistance, and an alternating current impedance was calculated from a reciprocal of the specific resistance. The proton conductivity was then calculated from this impedance.

[Specific resistance (Ω·cm)]=0.5 (cm)×[Thickness (cm)]×[Gradient of resistance wire spacing (ΩQ/cm)]

4. Evaluation of Methanol Permeability:

Ability of suppressing methanol permeation was evaluated using a pervaporation system in which a proton conductive membrane sample having a diameter of 50 mm was set in a prescribed cell, a methanol aqueous solution having a prescribed concentration was fed from the front surface side, and a permeated liquid was recovered in reduced pressure from the back surface side. That is, the characteristics were evaluated from a methanol flux and a separation factor under reduced pressure conditions at a methanol aqueous solution concentration of 10 wt % and a temperature of 25° C.

[Methanol flux (g/h/m²)]=[Amount of recovered permeated liquid (g)]/[Recovery time (h)]/[Sample area (m²)]×[Concentration of permeated liquid (%)]

(Separation factor)={(Concentration of permeated liquid)/[100−(Concentration of permeated liquid)]}/{(Concentration of feed liquid)/[100−(Concentration of feed liquid)]}

Synthesis of Sulfonic Acid Ester Derivative

SYNTHESIS EXAMPLE 1

(1) Preparation of sodium 4-[4-(2,5-dichlorobenzoyl)phenoxy]benzenesulfonate (A-SO₃Na Represented by the Following Formula (I)):

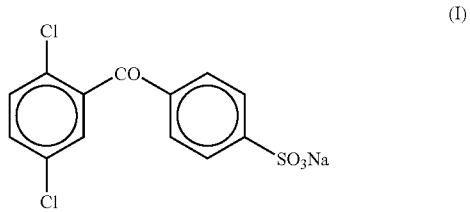

(I)

Figure 2:
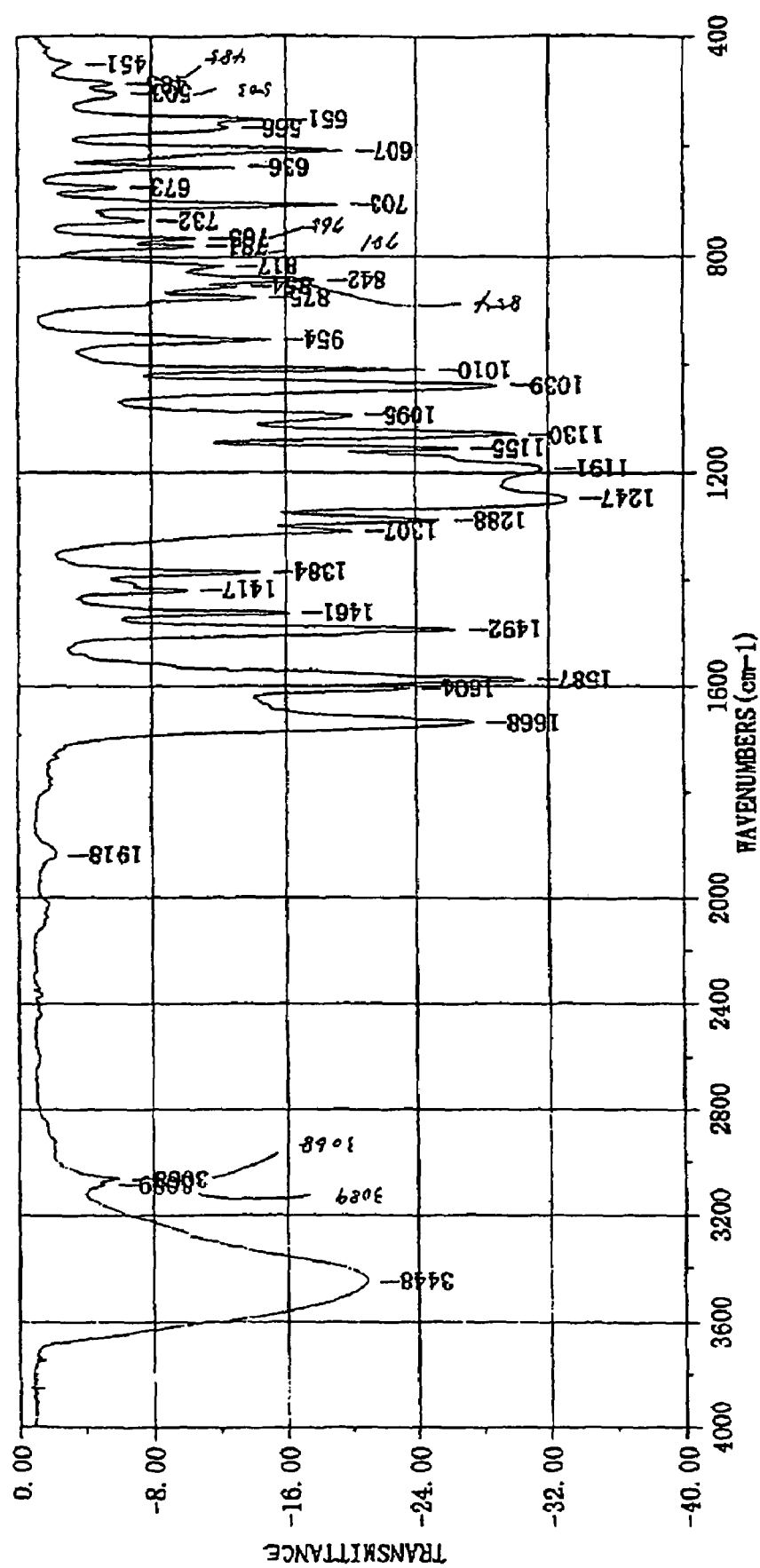
FIG. 2 is an IR spectrum of the white powder obtained in Synthesis Example 1-(1).
Figure 3:
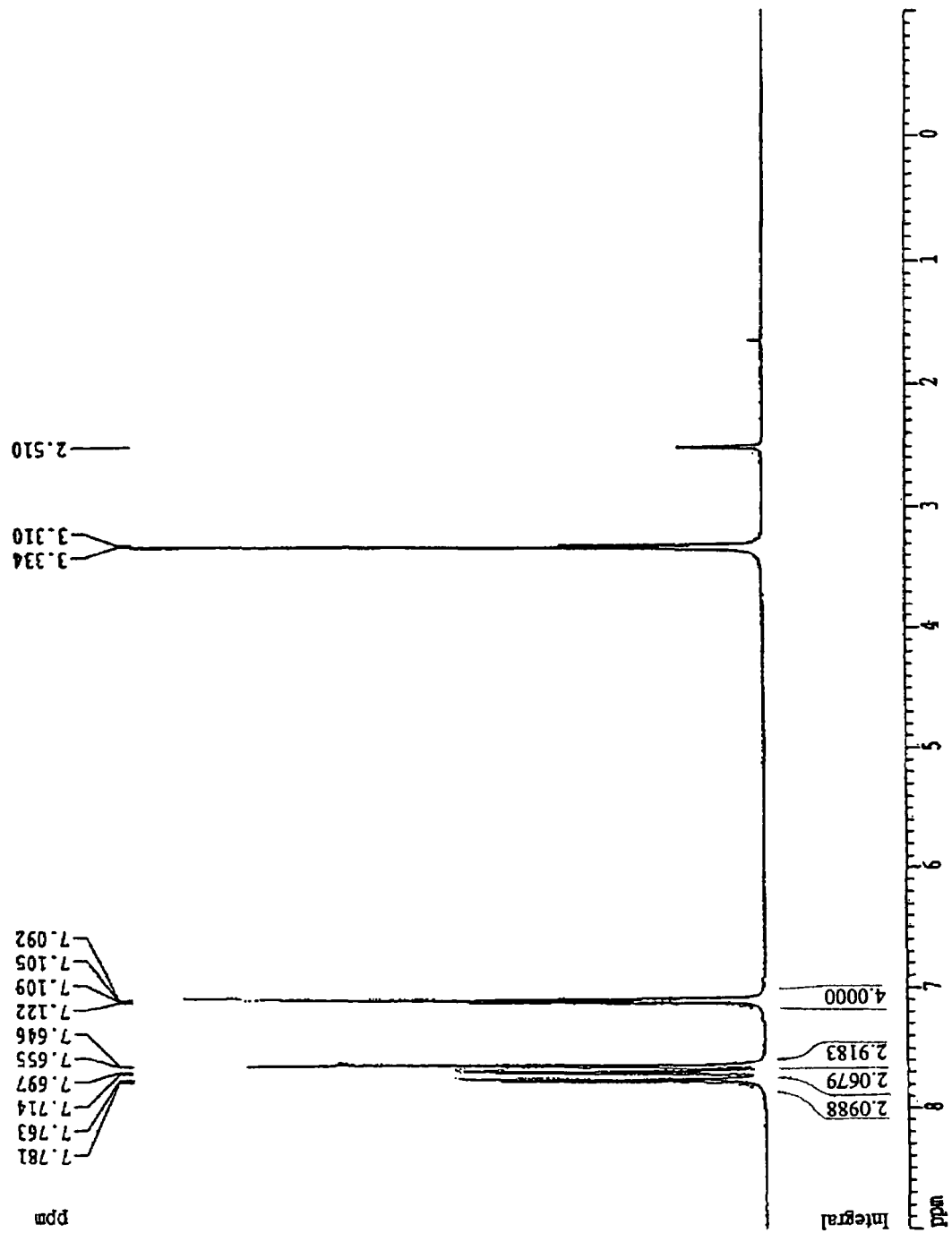
FIG. 3 is an NMR spectrum of the white powder obtained in Synthesis Example 1-(1).

In a 3-liter three-necked flask equipped with a stirrer and a condenser, 137.3 g (400 mmoles) of 2,5-dichloro-4'-phenoxybenzophenone (A) was added, 500 ml of 1,2-dichloroethane (1,2-DCE) was subsequently added, and the resulting mixture was dissolved. 2M acetyl sulfate solution newly prepared from 56 ml of concentrated sulfuric acid, 152 ml of acetic anhydride and 400 ml of 1,2-DCE was added to the flask with stirring, and the mixture was allowed to react in an oil bath at 60° C. for 3 hours. After a lapse of a prescribed period of time, the reaction was stopped by the addition of 300 ml of 1-propanol. The reaction system was concentrated to a volume of 400 ml, and an NaOH aqueous solution (120 g (3 moles)/400 ml of water) was further added. A transparent pale yellow solution obtained by distilling off residual 1,2-DCE in the system by means of azeotropy was cooled, and a deposited precipitate was filtered, followed by drying in reduced pressure at 70° C. to obtain a white powder of desired finely divided sodium 4-[4-(2,5-dichlorobenzoyl)phenoxy]benzenesulfonate (A-SO₃Na). A crude crystal was used in the subsequent step as it was without being purified. An IR spectrum and an NMR spectrum of the resulting white powder are shown in FIG. 2 and FIG. 3, respectively.

(2) Preparation of 4-[4-(2,5-dichlorobenzoyl)phenoxy]benzenesulfonic chloride (A-SO₂Cl Represented by the Following Formula (II)):

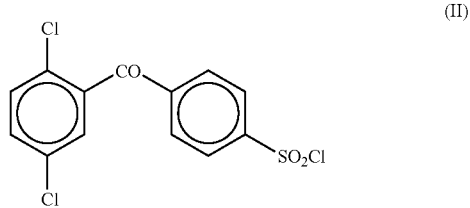

(II)

Figure 4:
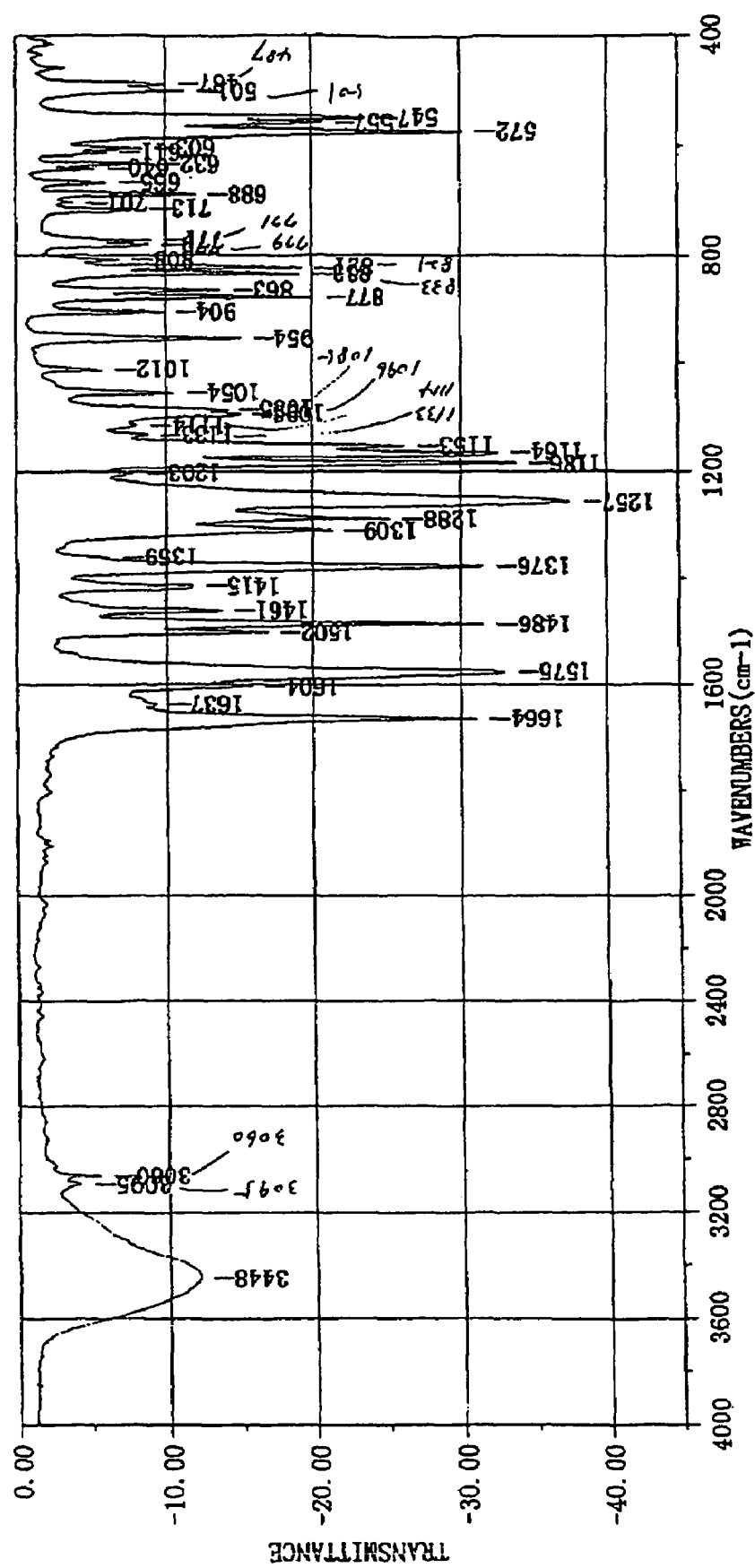
FIG. 4 is an IR spectrum of the white crystal obtained in Synthesis Example 1-(2).
Figure 5:
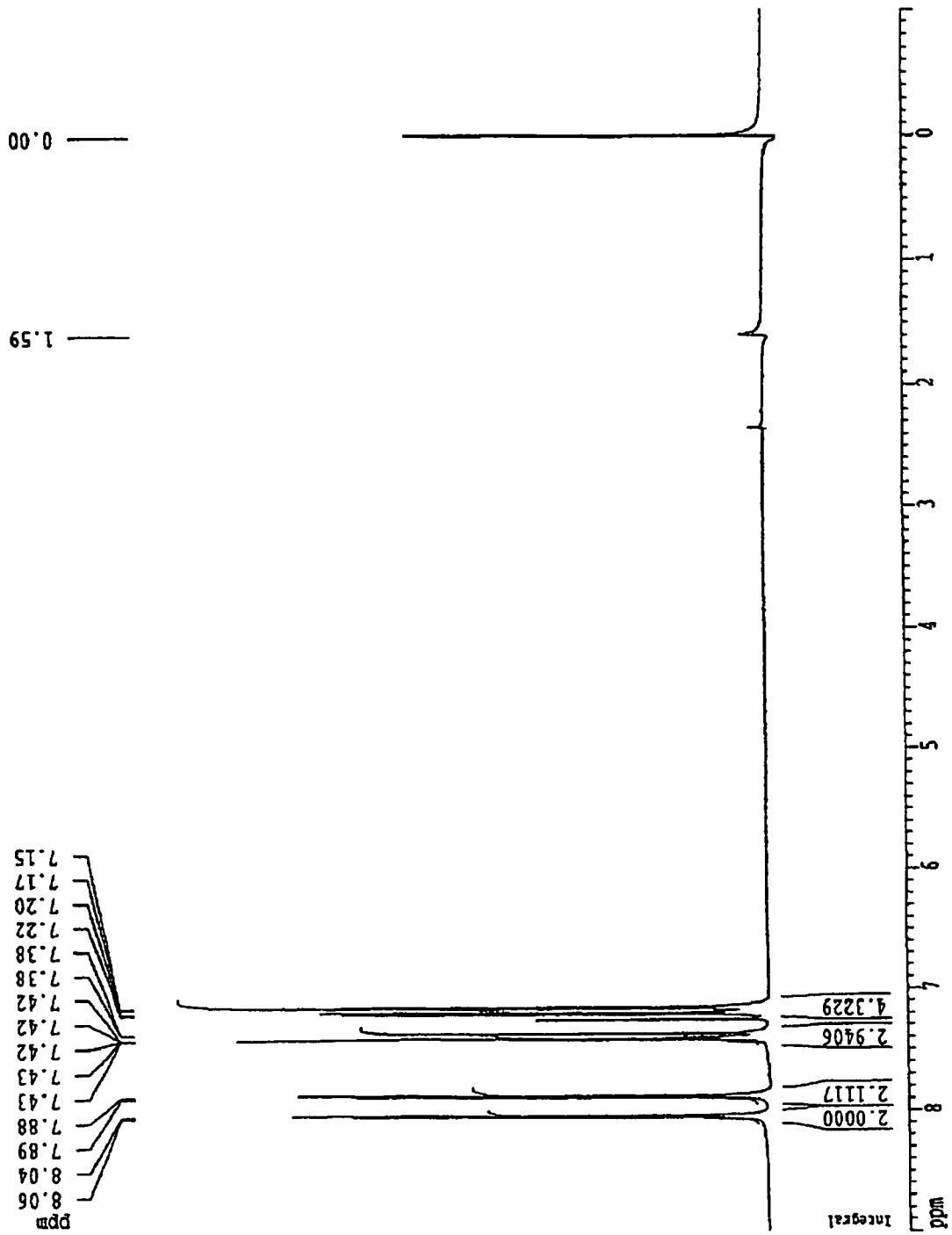
FIG. 5 is an NMR spectrum of the white crystal obtained in Synthesis Example 1-(2).

To 215 g (about 400 mmoles) of the crude crystal of A-SO₃Na, 300 ml of acetonitrile and 200 ml of sulforane were added as solvents, 245.3 g (1.6 moles) of phosphoryl trichloride was further added, and the mixture was allowed to react at 70° C. Further, 5 ml of N,N-dimethylacetamide was added, and a yellow suspension was stirred at 71-73° C. for 40 minutes and then cooled to 3° C. One liter of cold water was added at a rate such that the temperature of the reaction system did not exceed 10° C. A precipitate was collected by filtration, washed with cold water, and then recrystallized from 350 ml of toluene to obtain desired A-SO₂Cl in a yield of 153 g (percent yield: 87% (based on A)) as a white crystal (melting point: 130.5-131.5° C.). An IR spectrum and an NMR spectrum of this white crystal are shown in FIG. 4 and FIG. 5, respectively.

(3) Preparation of isobutyl 4-[4-(2,5-dichlorobenzoyl)phenoxy]benzenesulfonate (A-SO₃ i-Bu Represented by the Following Formula (III)):

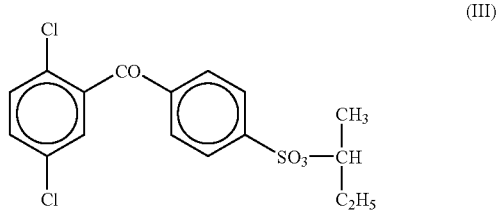

(III)

Figure 6:
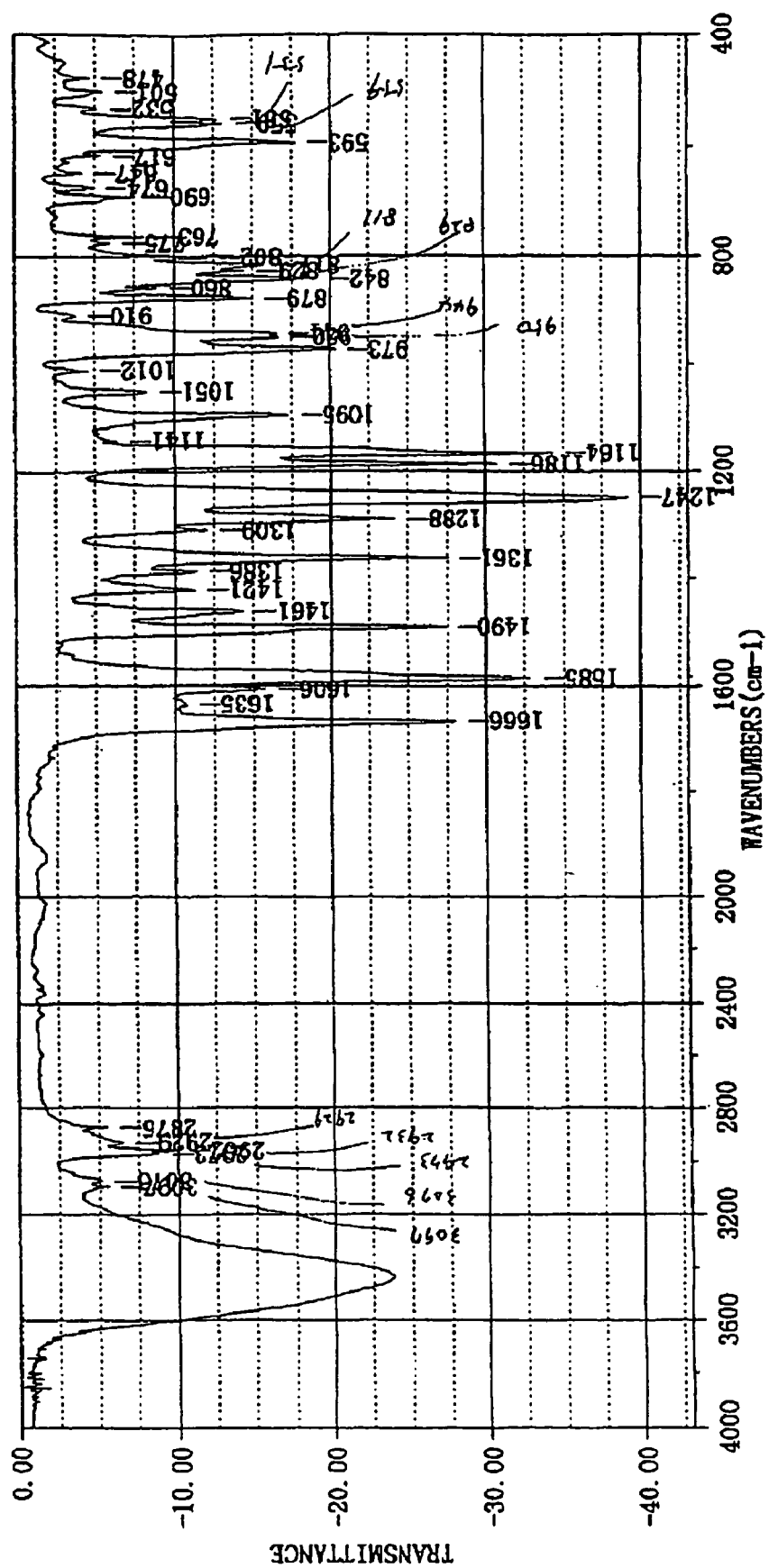
FIG. 6 is an IR spectrum of the white crystal obtained in Synthesis Example 1-(3).
Figure 7:
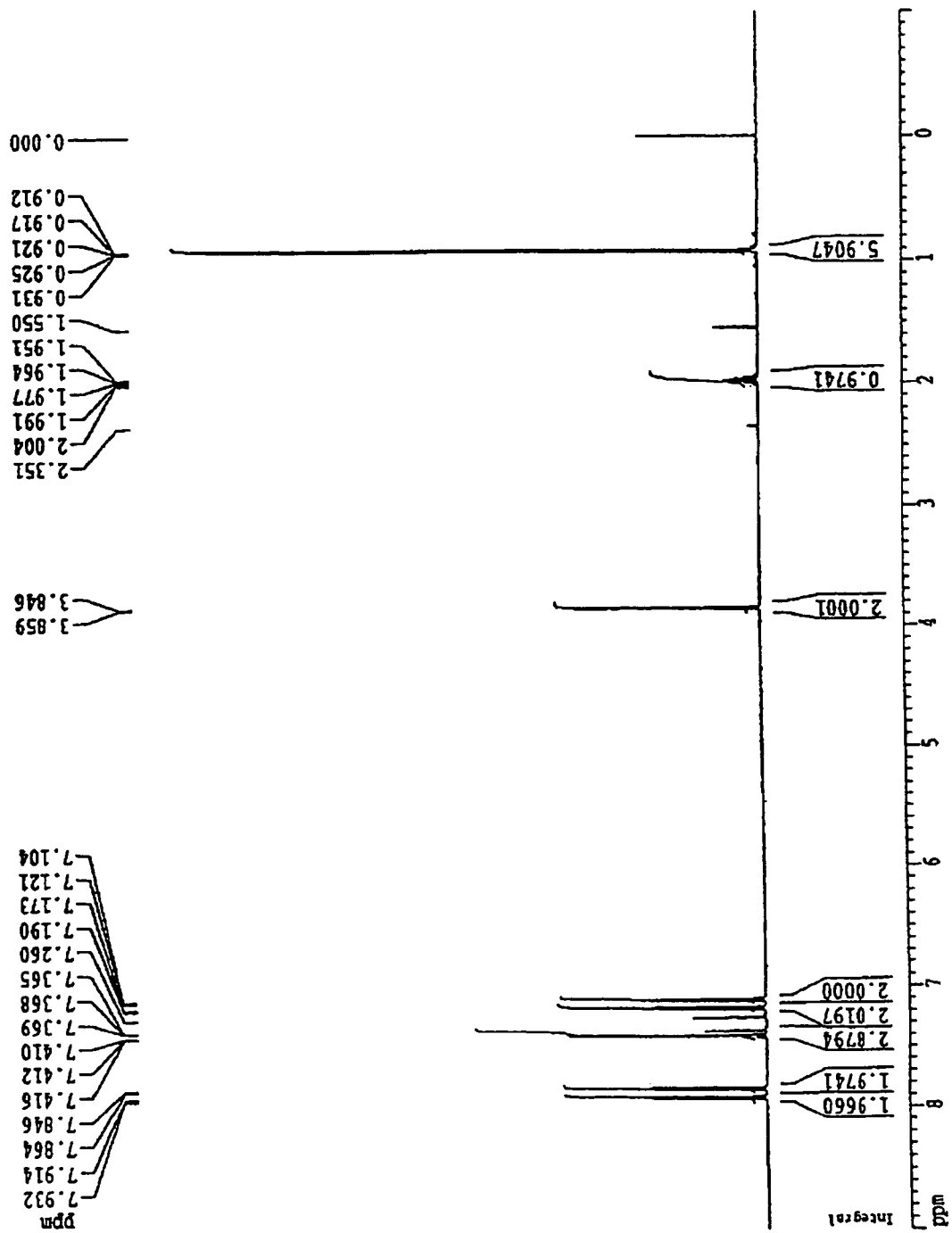
FIG. 7 is an NMR spectrum of the white crystal obtained in Synthesis Example 1-(3).

22.09 g (50 mmoles) of A-SO₂Cl was dropped in 4.0 g (55 mmoles) of 2-methyl-1-propanol and 30 ml of pyridine as solvents while cooling under mechanical stirring over 40 minutes. A dense suspension was obtained, and stirring was further continued at 12-15° C. for one hour. 30 ml of concentrated hydrochloric acid and 100 g of ice were added to the reaction system all at once. Stirring was continued until the suspension became uniform step by step. The resulting suspension was quickly filtered by a cooled Buchner funnel. A white viscous precipitate was recovered. The precipitate was again dissolved in 300 ml of ethyl acetate and washed with water using a separating funnel, an organic layer was dried over magnesium sulfate, and the solvent was distilled off in reduced pressure. After concentration, a pale yellow oily liquid was dissolved in 30 ml of hot hexane and allowed to stand in a freezer for several days to obtain 16.67 g of a white crystal of desired A-SO₃ i-Bu (melting point: 73-74° C.) in a percent yield of 70%. An IR spectrum and an NMR spectrum of this white crystal are shown in FIG. 6 and FIG. 7, respectively.

SYNTHESIS EXAMPLE 2

Preparation of neopentyl 4-[4-(2,5-dichlorobenzoyl)phenoxy]benzenesulfonate (A-SO₃ neo-Pe represented by the following formula (IV)):

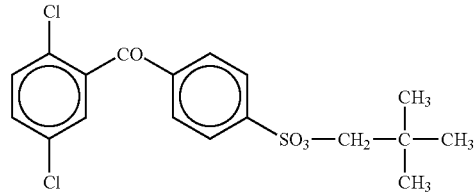

(IV)

22.09 g (50 mmoles) of A-SO₂Cl the same as obtained in Synthesis Example 1-(2) was dropped in a solution containing 4.85 g (55 mmoles) of 2,2-dimethyl-1-propanol and 30 ml of pyridine while cooling under mechanical stirring over 40 minutes. A dense suspension was obtained, and stirring was further continued at 12-15° C. for one hour.

Figure 8:
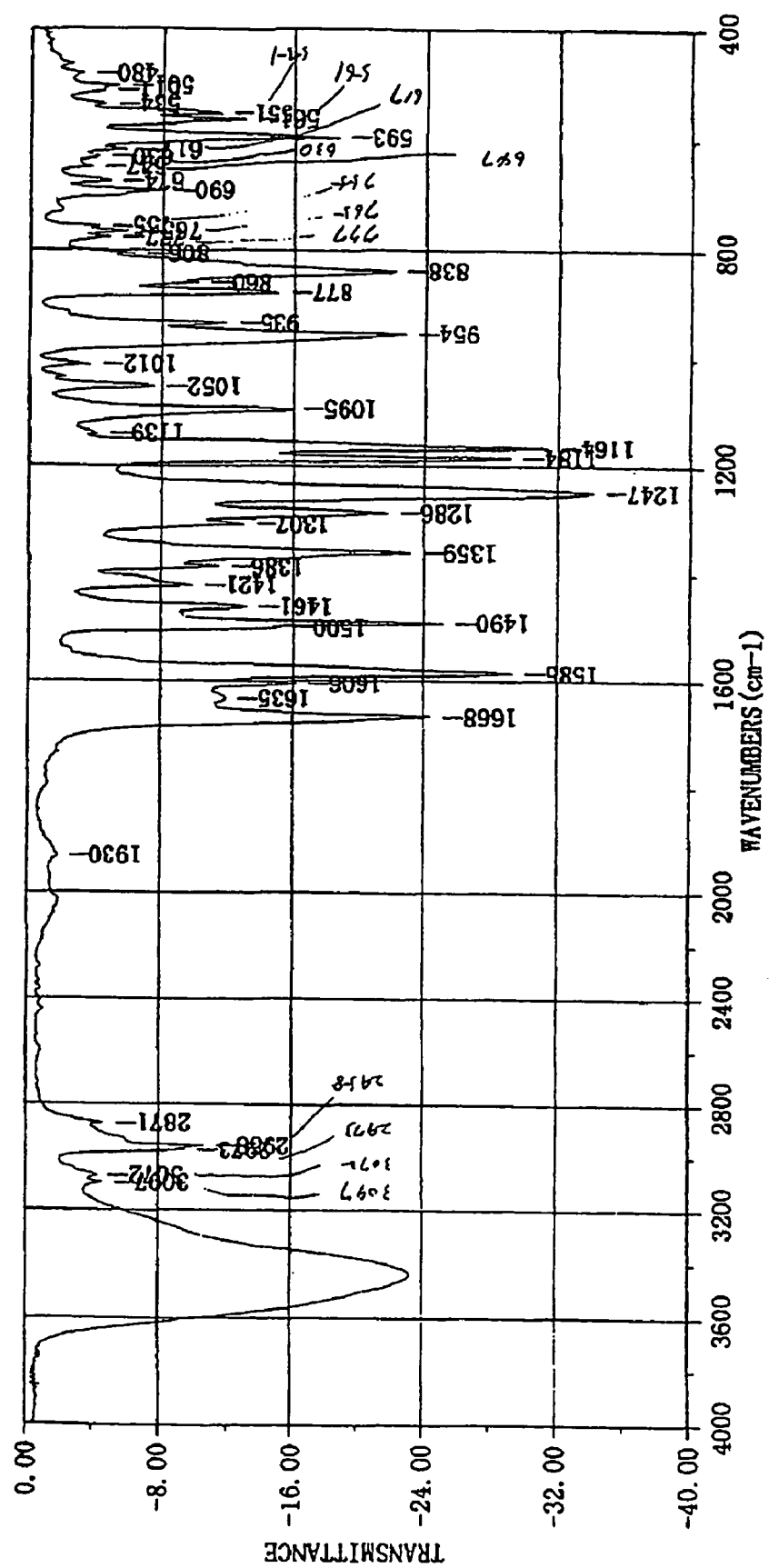
FIG. 8 is an IR spectrum of the white crystal obtained in Synthesis Example 2.
Figure 9:
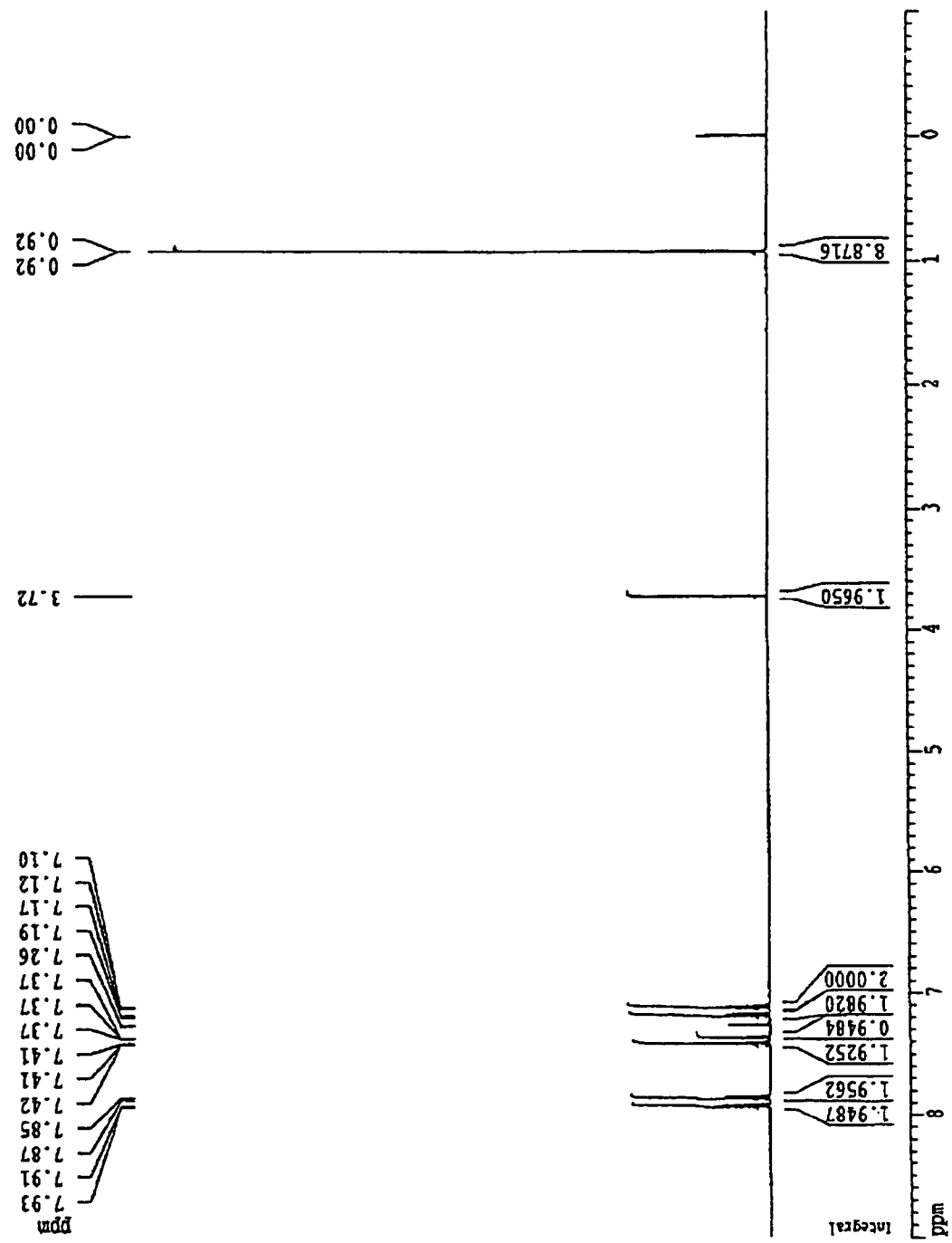
FIG. 9 is an NMR spectrum of the white crystal obtained in Synthesis Example 2.

The resulting suspension was allowed to react with 30 ml of concentrated hydrochloric acid and 100 g of ice to form a precipitate. The precipitate was collected by filtration, washed with cold water, dried, and then brought into contact with 150 ml of boiling toluene. An insoluble matter (the majority of which was a pyridinium salt of A-SO₃H) was removed by filtration, and a filtrate was concentrated to 40 ml. The concentrate was allowed to stand in a freezer to deposit a white crystal of A-SO₃ neo-Pe (melting point: 112.0-112.5° C.). A yield was 16.92 g, and a percent yield was 69%. An IR spectrum and an NMR spectrum of this white crystal are shown in FIG. 8 and FIG. 9, respectively.

Preparation of BCPHQ Oligomer

SYNTHESIS EXAMPLE 3

In a one-liter three-necked flask equipped with a sitter, a thermometer, a condenser, a Dean-Stark tuber, and a three-way cock for introducing nitrogen, 45.4 g (0.244 moles) of 2-phenylhydroquinone (2-PhHQ), 52.3 g (0.240 moles) of 4,4'-difluorobenzophenone (4,4'-DFBP), 35.3 g (0.257 moles) of potassium carbonate, 600 ml of NMP, and 300 ml of toluene were taken, and the mixture was heated in an oil bath in a nitrogen atmosphere and allowed to react at 130° C. with stirring. The reaction was carried out while subjecting water formed by the reaction to azeotropy with toluene and discharging out the system through the Dean-Stark tube. As a result, the formation of water was not substantially recognized after a lapse of about 3 hours. The reaction temperature was raised from 130° C. to 150° C. step by step.

The majority of toluene was removed while raising the reaction temperature to 150° C. step by step, and the reaction was continued at 150° C. for 10 hours. 7.0 g (0.032 moles) of 4,4'-chlorofluorobenzophenone (4,4'-CFBP) was then added, and the mixture was further allowed to react for 5 hours. After allowing the resulting reaction mixture to stand for cooling, a precipitate of an inorganic compound formed as a by-product was filtered off, and a filtrate was added in 4 liters of methanol. A precipitated product was separated by filtration, recovered, dried, and then dissolved in 300 ml of tetrahydrofuran. The resulting solution was reprecipitated in 4 liters of methanol to obtain 78 g of the desired compound (percent yield: 88%).

Figure 10:
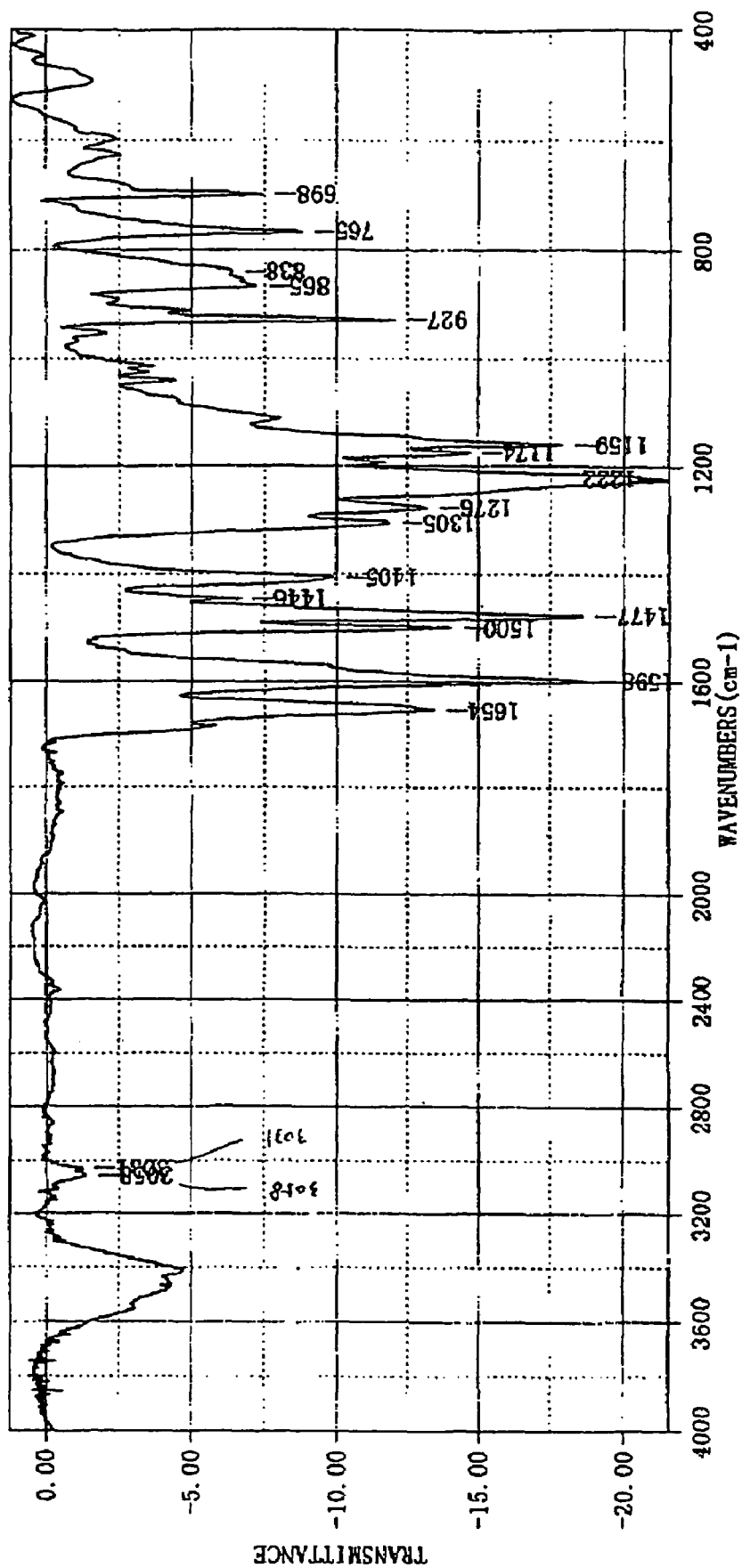
FIG. 10 is an IR spectrum of the polyarylene obtained in Synthesis Example 3.

The resulting polymer had a weight average molecular weight, as reduced into polystyrene by GPC (THF solvent), of 14,800. The resulting polymer was soluble in THF, NMP, DMI, etc. and had a Tg of 149° C. and a heat decomposition temperature Td5 of 480° C. An IR spectrum of this polymer is shown in FIG. 10.

The resulting polymer was an oligomer represented by the following formula (V) (hereinafter sometimes referred to as "BCPhHQ oligomer").

SYNTHESIS EXAMPLE 4

Reaction and post treatment were carried out in the same procedures as in the above Synthesis Example 3, except that in Synthesis Example 3, 124.7 g (0.248 moles) of 9,9-bis (4-hydroxy-3-phenylphenyl)fluorene (FLPBP) was used in place of 45.4 g (0.244 moles) of 2-phenylhydroquinone (2-PhHQ) and that DMAc was used as the solvent in place of NMP. There was thus obtained 150 g of the desired compound (percent yield: 83%).

Figure 11:
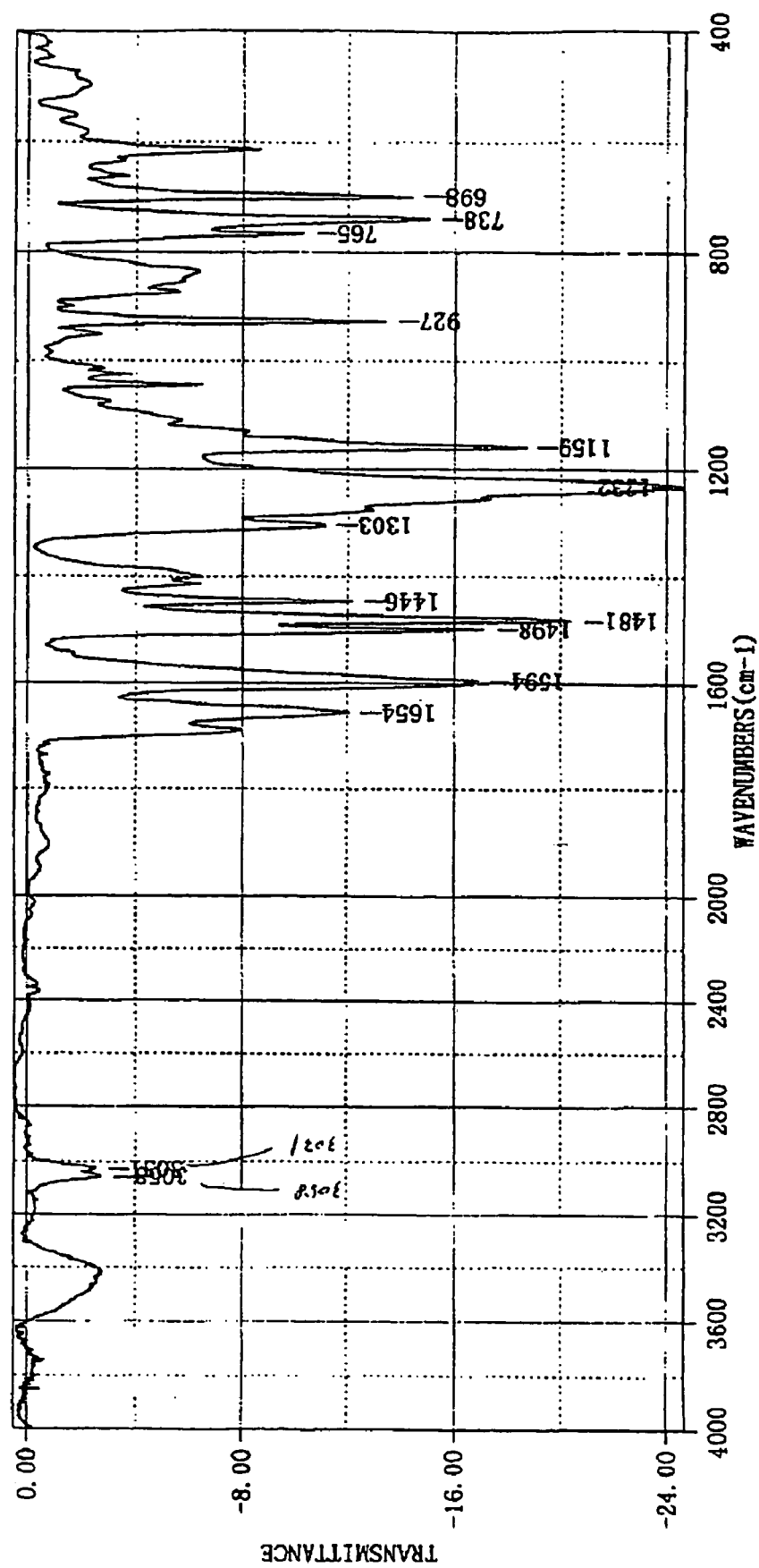
FIG. 11 is an IR spectrum of the polyarylene obtained in Synthesis Example 4.

The resulting polymer had a weight average molecular weight, as reduced into polystyrene by GPC (THF solvent), of 19,600. Also, the resulting polymer was soluble in THF, NMP, DMI, etc. and had a Tg of 223° C. and a heat decomposition temperature Td5 of 558° C. An IR spectrum of this polymer is shown in FIG. 11.

The resulting polymer was an oligomer represented by the following formula (VI) (hereinafter sometimes referred to as "BCFLP oligomer").

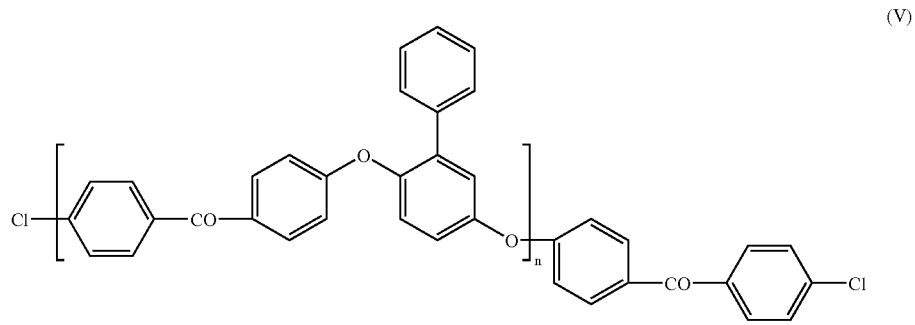

(V)

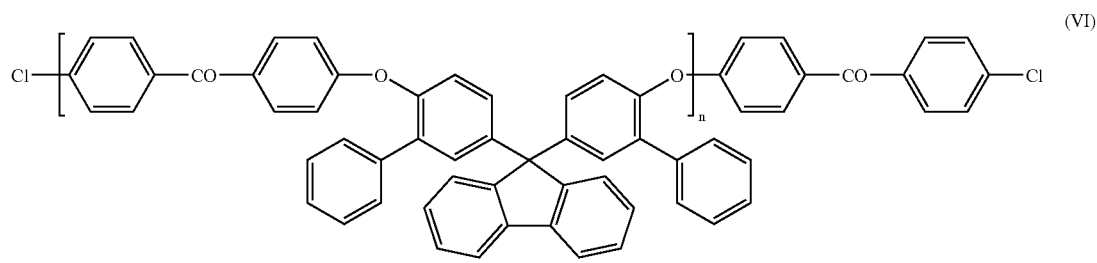

(VI)

Polymerization of Polyarylene

EXAMPLE 1

Figure 12:
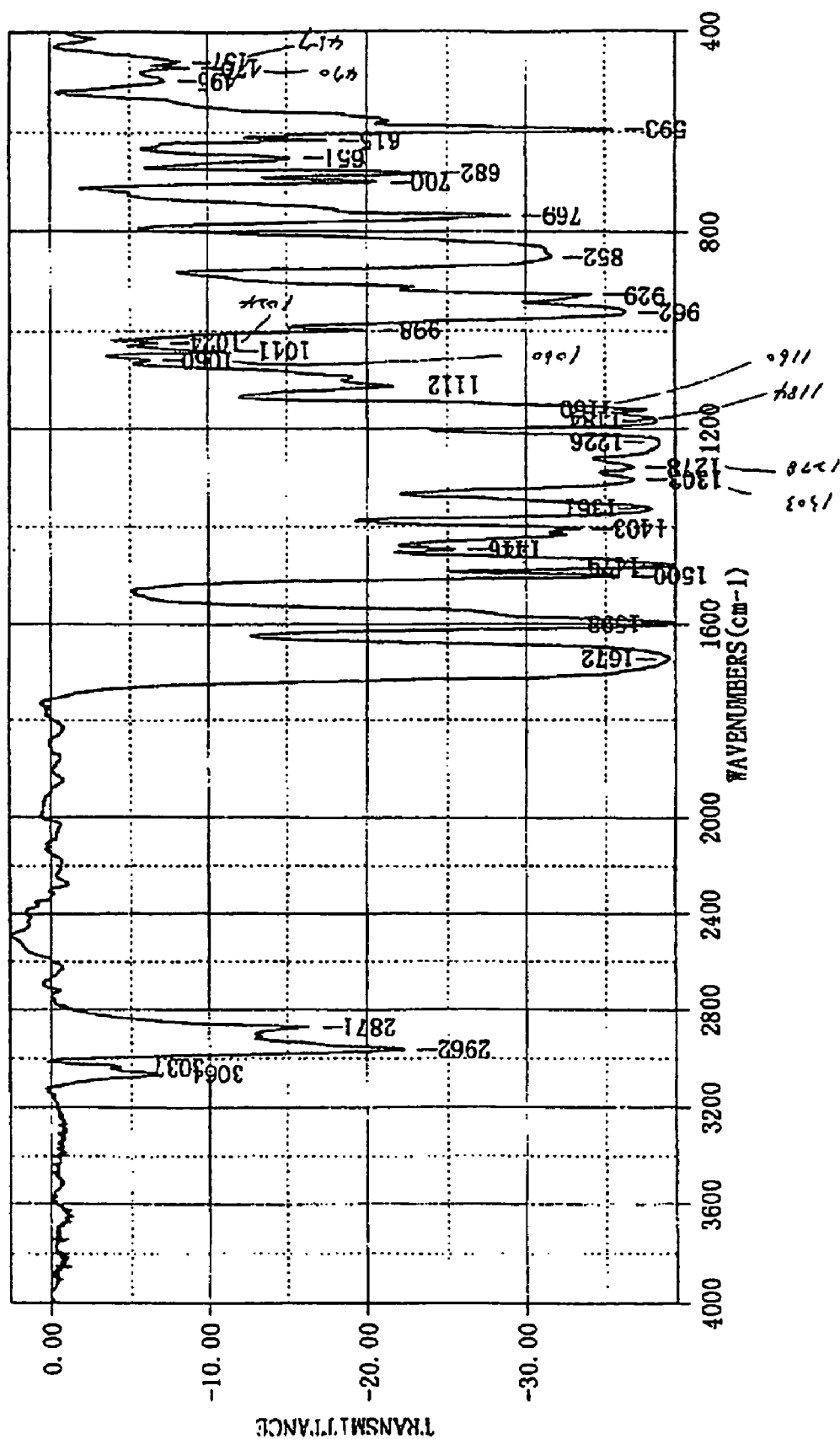
FIG. 12 is an IR spectrum of the polyarylene obtained in Example 1.

Preparation of Polyarylene Copolymer having Neopentyl Group as Protective Group (Poly A.BCPhHQ-SO$_3$ neo-Pe):

129 ml of dried NMP was added in a mixture of 39.69 g (98.9 mmoles) of A-SO$_3$ neo-Pe obtained in Synthesis Example 1, 17.12 mg (1.1 mmoles) of the BCPhHQ oligomer (Mn=14,800) obtained in Synthesis Example 3, 1.96 g (0.30 mmoles) of Ni(PPh$_3$)$_2$Cl$_2$, 10.49 g (4.00 mmoles) of PPh$_3$, 0.45 g (0.30 mmoles) of NaI, and 15.69 g (24.0 mmoles) of zinc powder under nitrogen, and the reaction system was heated with stirring (ultimately heated to 74° C.). Sixty minutes after initiation of the polymerization reaction, an increase of the viscosity in the system was observed. The polymerization reaction was continued for 3 hours while stirring, the reaction mixture was then diluted with 250 ml of THF, stirred for 30 minutes and then filtered using a Celite as a filtration aid, and a filtrate was poured and solidified in a large excess of methanol (1,500 ml). The solidified product was collected by filtration, air dried, again dissolved in THF/NMP (200 ml/30 ml, respectively), and then solidified and deposited by a large excess of methanol (1,500 ml). After air drying, the solidified product was heat dried to obtain 44.5 g (percent yield: 89%) of a desired copolymer comprising a sulfonic acid derivative protected by a neopentyl group (Poly A.BCPhHQ-SO$_3$ neo-Pe) in the yellow fibrous state. The molecular weight of this copolymer by GPC was Mn=50,900 and Mw=149,700. An IR spectrum of this copolymer is shown in FIG. 12.

Conversion of Poly A.BCPhHQ-SO$_3$ neo-Pe into Sulfonic Acid Group-containing Polyarylene (Poly A.BCPhHQ-SO$_3$H) by Means of Hydrolysis:

35.0 g of the foregoing Poly A.BCPhHQ-SO$_3$ neo-Pe was added to 260 ml of NMP containing 10.03 g (1.5 mmoles against SO$_3$ neo-Pe) of lithium bromide step by step. A viscous solution was heated to 120° C. The reaction was carried out while confirming a deprotection rate of the ester group by sampling through IR for 8 hours in total. After the reaction, the reaction mixture was allowed to stand for cooling. A precipitate was collected and suspended in 400 ml of acetone with stirring, followed by washing. The precipitate was further collected and ion exchanged with a 10% hydrochloric acid aqueous solution, followed by air drying to obtain a crude product. The crude product was washed twice with water. There was ultimately obtained a pale brown powdered polymer (polymer (1)).

A 12 wt % NMP solution of the resulting polymer was cast on a glass plate to form a film. After air drying and drying in reduced pressure, a film having a dry thickness of 40 μm was obtained. It was noted from quantitative analysis of the IR spectrum and ion exchange capacity that the sulfonic acid ester group (—SO$_3$R) was quantitatively converted into a sulfonic acid group (—SO$_3$H).

Figure 13:
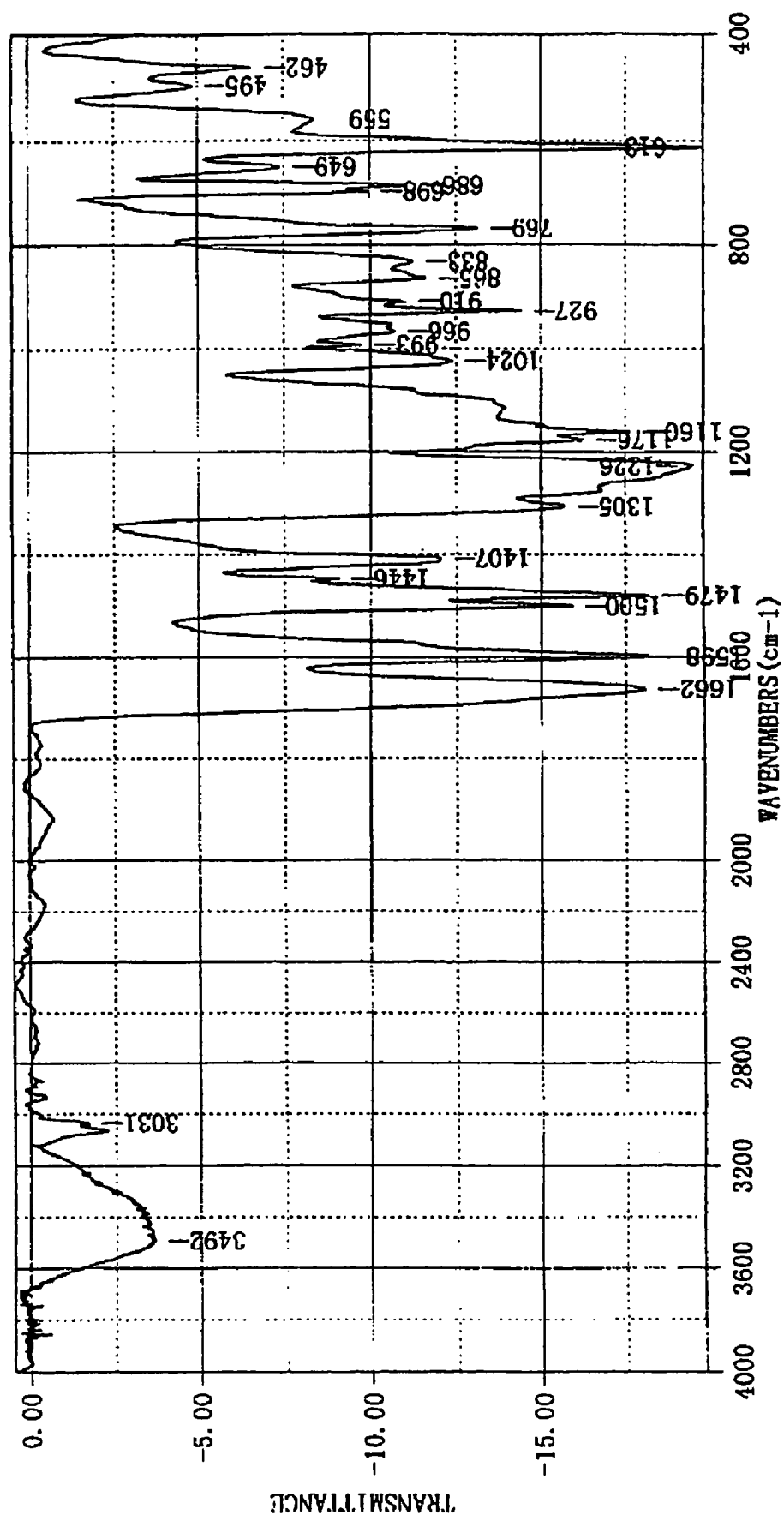
FIG. 13 is an IR spectrum of the sulfonic acid group-containing polyarylene obtained in Example 1.

An IR spectrum is shown in FIG. 13. The amount of the sulfonic acid group in the polymer was 2.1 mg-equivalent/g (2.2 mg-equivalent/g from the molar number of the charged monomers at the time of polymerization).

EXAMPLE 2

Preparation of Polyarylene Copolymer having Neopentyl Group as Protective Group (Poly A.BCFLP-SO$_3$ neo-Pe):

15.43 g (0.9 mmoles) of the BCFLP oligomer (Mn=19,600) obtained in Synthesis Example 4 was used in place of 17.12 g (1.1 mmoles) of the BCPhHQ oligomer (Mn=14,800), and other reagents were used in the same amounts as in Example 1. With respect to the operations, the polymerization and post treatment were carried out in the same manner as in Example 1.

Figure 14:
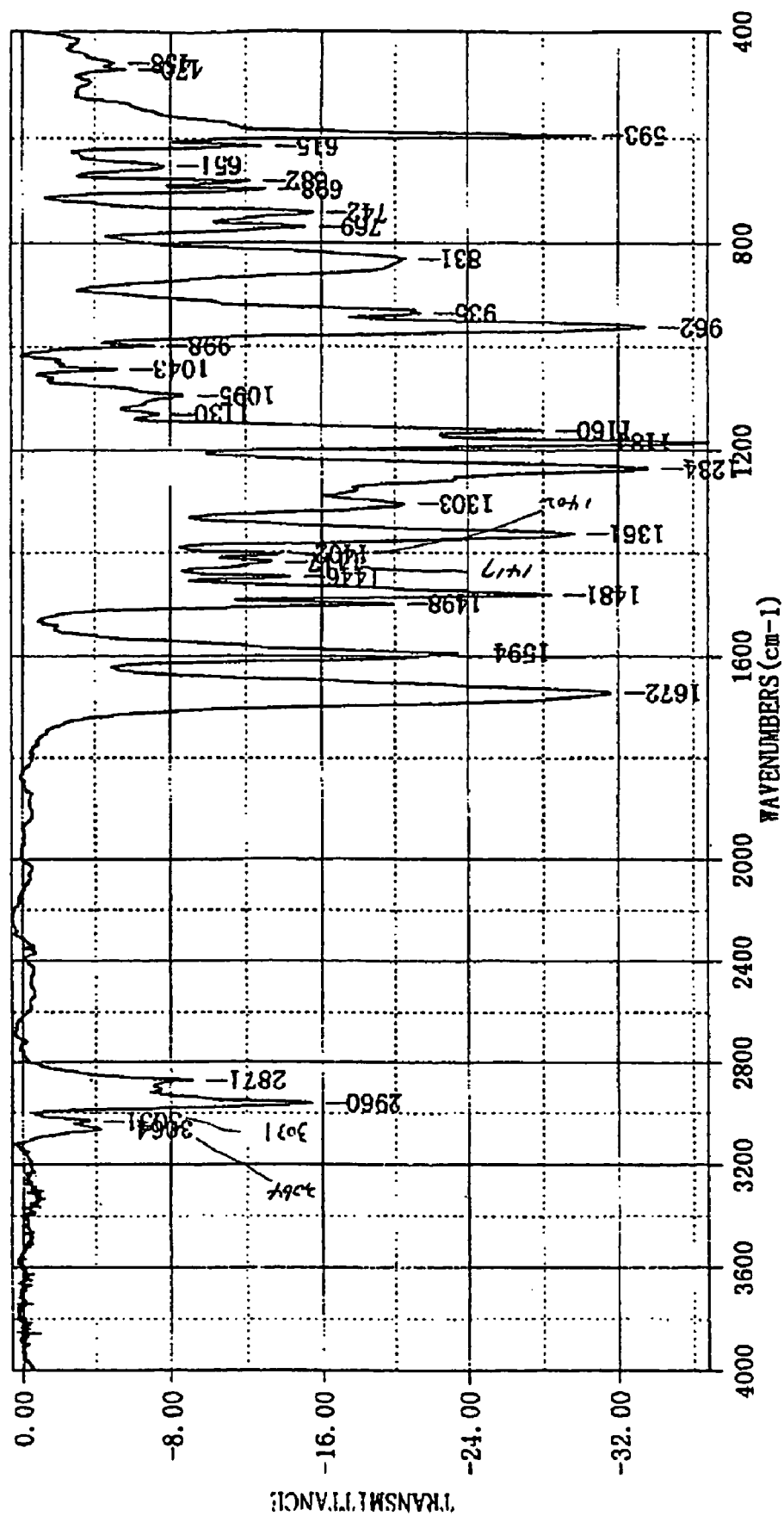
FIG. 14 is an IR spectrum of the polyarylene obtained in Example 2.

There was thus obtained 35.89 g (percent yield: 72%) of a desired copolymer comprising a sulfonic acid derivative protected by a neopentyl group (Poly A.BCFLP-SO$_3$ neo-Pe) in the yellow fibrous state. The molecular weight of this copolymer by GPC was Mn=77,500 and Mw=165,300. An IR spectrum of this copolymer is shown in FIG. 14.

Conversion of Poly A.BCFLP-SO$_3$ neo-Pe into Sulfonic Acid Group-containing Polyarylene (Poly A.BCFLP-SO$_3$H) by Means of Hydrolysis:

The same operations as in Example 1 were followed, except using 30 g of the foregoing Poly A.BCFLP-SO$_3$ neo-Pe in place of the Poly A.BCPhHQ-SO$_3$ neo-Pe, 40 ml of NMP and 8.6 g of lithium bromide. There was ultimately obtained a pale brown powdered polymer (polymer (2)).

A 12 wt % NMP solution of the resulting polymer was cast on a glass plate to form a film. After air drying and drying in reduced pressure, a film having a dry thickness of 40 μm was obtained. It was noted from quantitative analysis of the IR spectrum and ion exchange capacity that the sulfonic acid ester group (—SO$_3$R) was quantitatively converted into a sulfonic acid group (—SO$_3$H).

Figure 15:
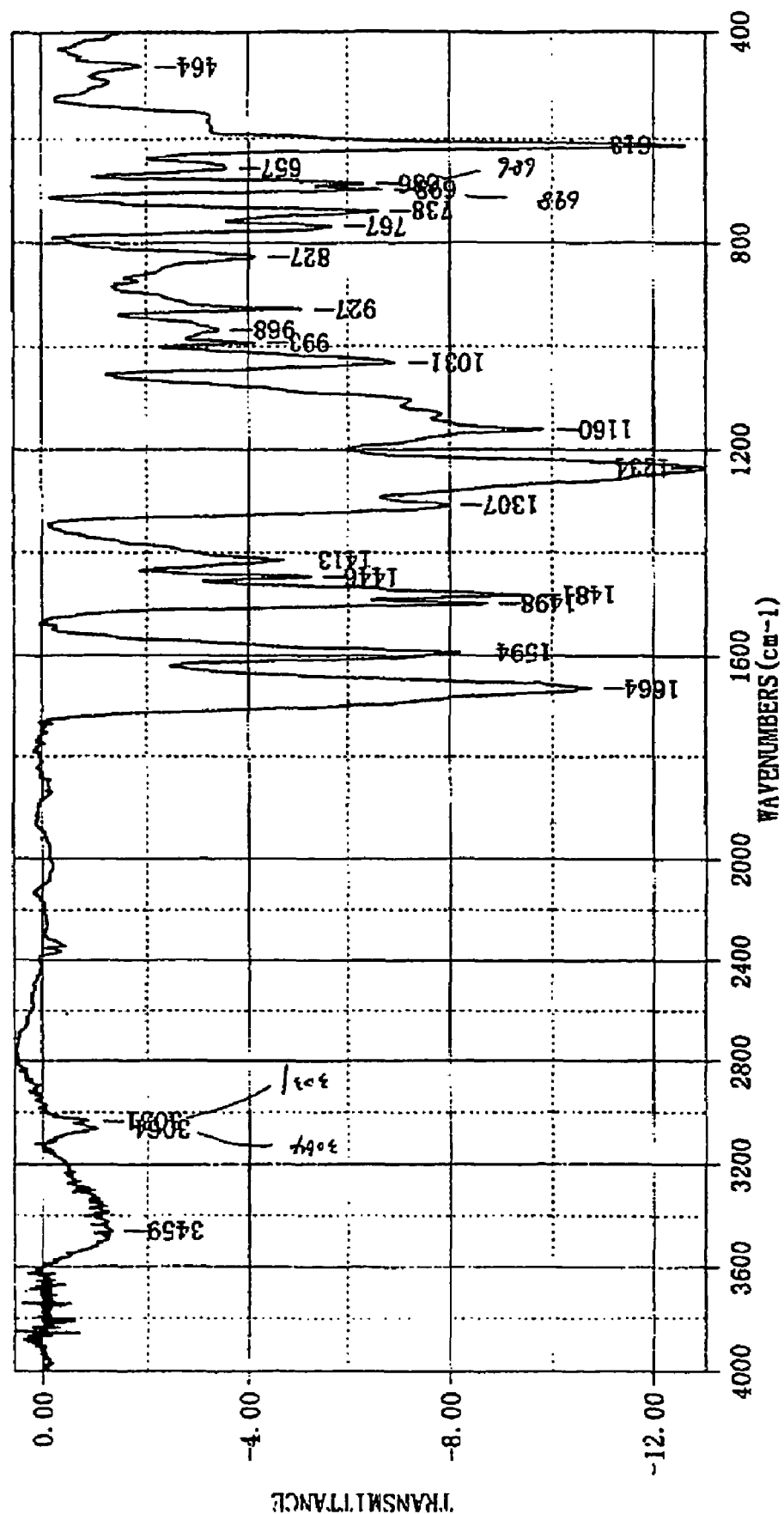
FIG. 15 is an IR spectrum of the sulfonic acid group-containing polyarylene obtained in Example 2.

An IR spectrum is shown in FIG. 15. The amount of the sulfonic acid group in the polymer was 2.2 mg-equivalent/g (2.2 mg-equivalent/g from the molar number of the charged monomers at the time of polymerization).

The characteristics of the films of the sulfonic acid group-containing polyarylenes obtained in the foregoing Examples are shown in the following Tables.

TABLE 1

| | Proton conductivity | |
|---|---|---|
| | At 60° C. and 80% RH | At 25° C. and 80% RH |
| Nafion-117 | 0.090 | 0.049 |
| Polymer (1): Example 1 | 0.109 | 0.051 |
| Polymer (2): Example 2 | 0.065 | 0.026 |

TABLE 2

| | Methanol permeability | |
|---|---|---|
| | Separation factor | Methanol flux |
| Nafion-117 | 2.18 | 158 |
| Polymer (1): Example 1 | 1.96 | 150 |
| Polymer (2): Example 2 | 0.77 | 51 |

EXAMPLE 3

An anode catalyst powder containing platinum and ruthenium as catalyst components and a cathode catalyst powder containing platinum as a catalyst component were respectively mixed in distilled water, a 60 wt % polytetrafluoroethylene solution (manufactured by Du Pont-Mitsui Fluorochemicals Co., Ltd.), and a 5 wt % Nafion solution (manufactured by Aldrich) to form pastes. These pastes were respectively coated on a diffusion layer which had been subjected to water-repellent treatment in advance, to obtain a negative electrode and a positive electrode. The proton conductive membrane obtained in Example 1 was put between these electrodes and welded under a pressure under conditions at a pressure of 60 kg/cm$^2$, at a temperature of 146° C. for a period of time of 3 minutes, to prepare a membrane-electrode assembly.

Using the resulting membrane-electrode assembly, a single cell was assembled by a known method and measured for power generation performance. As a result, the single cell had a good performance.

It should further be apparent to those skilled in the art that various changes in form and detail of the invention as shown and described above may be made. It is intended that such changes be included within the spirit and scope of the claims appended hereto.

This application is based on Japanese Patent Application No. 2003-1433914 filed May 21, 2003, the disclosure of which is incorporated herein by reference in its entirety.

What is claimed is:

1. A membrane-electrode assembly for direct methanol type fuel cell comprising a negative electrode and a positive electrode assembled via a proton conductive membrane, the negative electrode being provided with a negative electrode-side separator having a mechanism for feeding a methanol aqueous solution as a fuel, the positive electrode being provided with a positive electrode-side separator having a mechanism for feeding an oxidizing agent gas, and the proton conductive membrane comprising a polymer containing 0.05-99.95 mol % of a repeating constitutional unit represented by the following general formula (A):

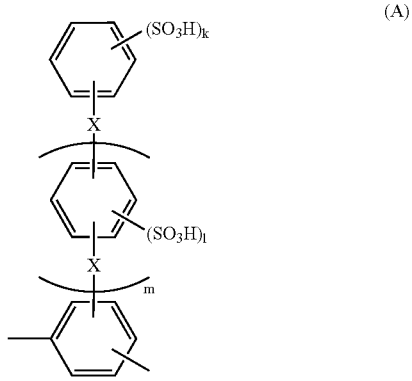

wherein X represents a single bond (—) or an electron withdrawing group or electron donating group; m represents an integer of 0-10; when m is 1-10, Xs may be the same or different; k represents an integer of 0-5; l represents an integer of 0-4; and (k+l)≧1, and 0.05-99.95 mol % of a repeating constitutional unit represented by the following general formula (B-1) or (B-2):

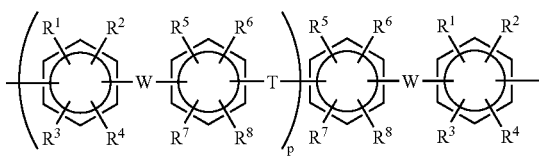

wherein $R^1$ to $R^8$ may be the same or different and each represents at least one atom or group selected from the group consisting of a hydrogen atom, a fluorine atom, an alkyl group, a fluorine-substituted alkyl group, an allyl group, an aryl group, and a cyano group; W represents a divalent electron withdrawing group; T represents at least one group selected from divalent groups represented by the following general formula (C-1) or (C-2):

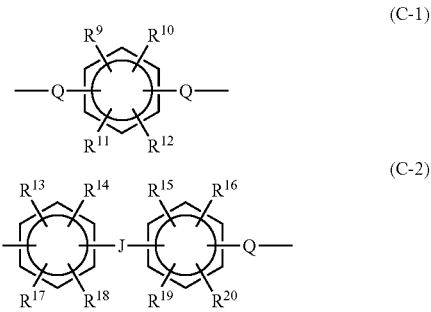

wherein $R^9$ to $R^{20}$ may be the same or different and each represents at least one atom or group selected from the group consisting of a hydrogen atom, a fluorine atom, an alkyl group, a fluorine-substituted alkyl group, an allyl group, an aryl group, and a cyano group; Q represents a divalent electron donating group selected from the group consisting of —O—, —S—, —CH=CH—, and —C≡C—; and J represents at least one group selected from the following formulae

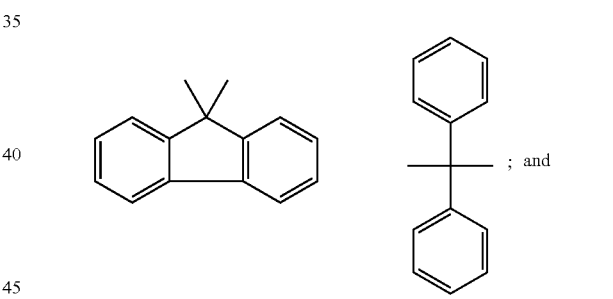

p represents an integer of 1 to 80;

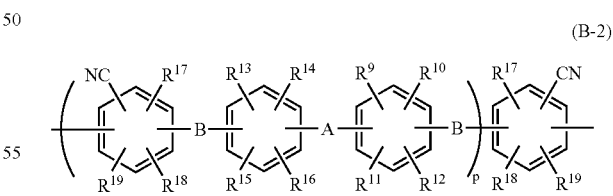

wherein $R^9$ to $R^{19}$ may be the same or different and each represents at least one atom or group selected from the group consisting of a hydrogen atom, a fluorine atom, an alkyl group, a fluorine-substituted alkyl group, an allyl group, an aryl group, and a cyano group; A represents a single bond or a divalent electron withdrawing group; B represents a divalent donating group; and p represents an integer of 1 to 80.

2. A proton conductive membrane for direct methanol type fuel cell, comprising a polymer containing 0.05-99.95 mol % of a repeating constitutional unit represented by the following general formula (A):

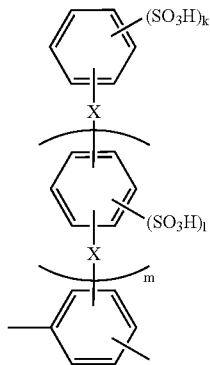
(A)

wherein X represents a single bond (—) or an electron withdrawing group or electron donating group; m represents an integer of 0-10; when m is 1-10, Xs may be the same or different; k represents an integer of 0-5; l represents an integer of 0-4; and (k+l)≧1, and 0.05-99.95 mol % of a repeating constitutional unit represented by the following general formula (B-1) or (B-2):

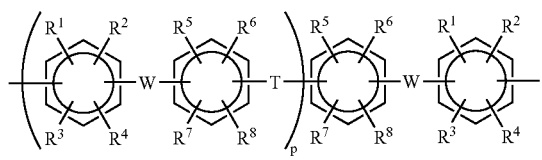
B-1 wherein $R^1$ to $R^8$ may be the same or different and each represents at least one atom or group selected from the group consisting of a hydrogen atom, a fluorine atom, an alkyl group, a fluorine-substituted alkyl group, an allyl group, an aryl group, and a cyano group; W represents a divalent electron withdrawing group; T represents at least one group selected from divalent groups represented by the following general formula (C-1) or (C-2):

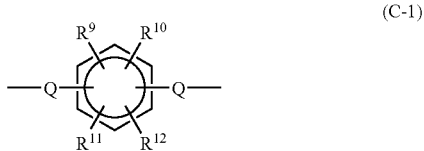
(C-1)

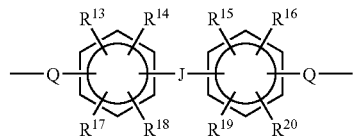
(C-2)

wherein $R^9$ to $R^{20}$ may be the same or different and each represents at least one atom or group selected from the group consisting of a hydrogen atom, a fluorine atom, an alkyl group, a fluorine-substituted alkyl group, an allyl group, an aryl group, and a cyano group; Q represents a divalent electron donating group selected from the group consisting of —O—, —S—, —CH=CH—, and —C≡C—; and J represents at least one group selected from the following formulae

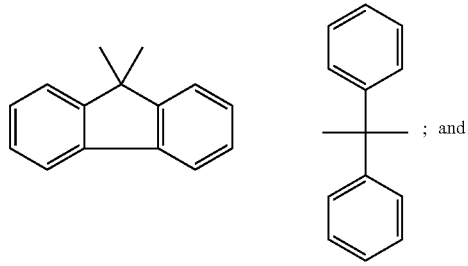
; and p represents an integer of 1 to 80;

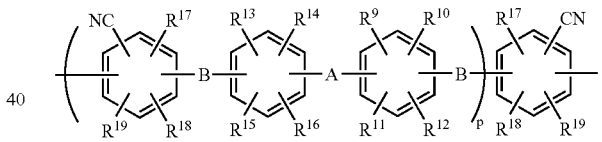
(B-2)

wherein $R^9$ to $R^{19}$ may be the same or different and each represents at least one atom or group selected from the group consisting of a hydrogen atom, a fluorine atom, an alkyl group, a fluorine-substituted alkyl group, an allyl group, an aryl group, and a cyano group; A represents a single bond or a divalent electron withdrawing group; B represents a divalent donating group; and p represents an integer of 1 to 80.

3. The membrane-electrode assembly according to claim 1, wherein p in formulae (B-1) and (B-2) represents an integer from 10 to 80.

4. The proton conductive membrane according to claim 2, wherein p in formulae (B-1) and (B-2) represents an integer from 10 to 80.

* * * * *